(12) United States Patent  
Goto et al.

(10) Patent No.: US 8,385,480 B2  
(45) Date of Patent: Feb. 26, 2013

(54) RECEIVING APPARATUS AND RECEIVING METHOD

(75) Inventors: Yuken Goto, Tokyo (JP); Naoto Nagaki, Tokyo (JP); Satoshi Okada, Tokyo (JP); Kentaro Nakahara, Tokyo (JP); Koji Naniwada, Tokyo (JP)

(73) Assignee: Sony Corporation, Tokyo (JP)

(*) Notice: Subject to any disclaimer, the term of this patent is extended or adjusted under 35 U.S.C. 154(b) by 294 days.

(21) Appl. No.: 12/851,927

(22) Filed: Aug. 6, 2010

(65) Prior Publication Data

US 2011/0038444 A1 Feb. 17, 2011

(30) Foreign Application Priority Data

Aug. 13, 2009 (JP) .............................. P2009-187803

(51) Int. Cl.
*H04L 27/06* (2006.01)

(52) U.S. Cl. ........ 375/343; 375/316; 375/147; 375/149; 375/150; 375/152; 375/260; 375/259; 375/342

(58) Field of Classification Search ................... 375/343, 375/316, 147, 149, 150, 152, 260, 259, 342
See application file for complete search history.

(56) References Cited

U.S. PATENT DOCUMENTS

2009/0190039 A1* 7/2009 Yun et al. ...................... 348/724
2009/0225822 A1* 9/2009 Tupala et al. ................. 375/226
2010/0091916 A1* 4/2010 Henriksson et al. .......... 375/343

OTHER PUBLICATIONS

"Frame Structure Channel Coding and Modulation for a Second Generation Digital Terrestrial Television Broadcasting System (DVB-T2)", DVB Document A122 Jun. 2008.

* cited by examiner

*Primary Examiner* — Siu Lee
(74) *Attorney, Agent, or Firm* — Frommer Lawrence & Haug LLP; William S. Frommer

(57) ABSTRACT

Disclosed herein is a receiving apparatus including a first correlation value computation section, an operation section, a second correlation value computation section, a decoding section, and a determination section.

7 Claims, 17 Drawing Sheets

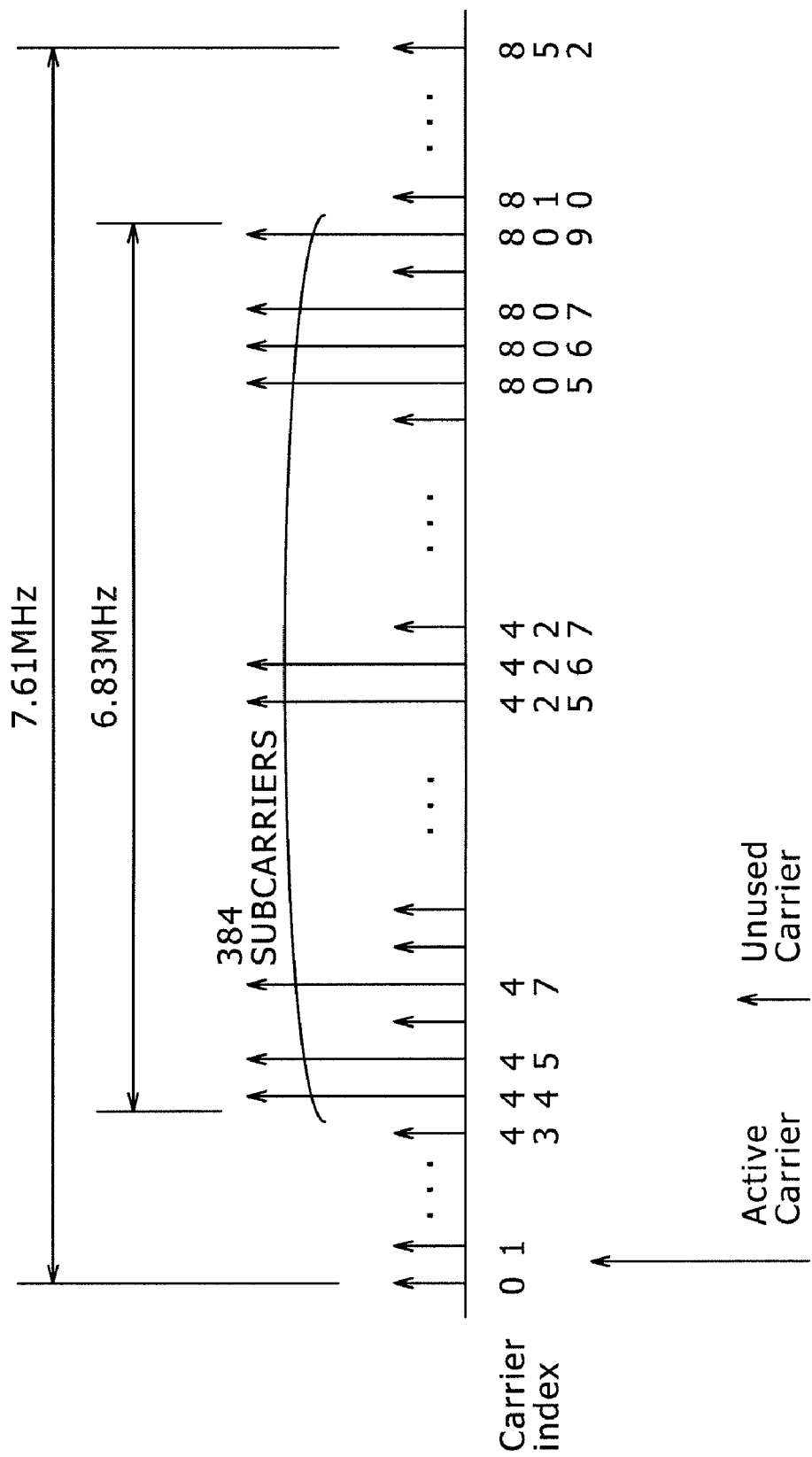

FIG.12

| Field | Val | Sequence (Hexadecimal notation) |
|---|---|---|
| S1 | 000 | 124721741D482E7B |
|  | 001 | 47127421481D7B2E |
|  | 010 | 217412472E7B1D48 |
|  | 011 | 742147127B2E481D |
|  | 100 | 1D482E7B12472174 |
|  | 101 | 481D7B2E47127421 |
|  | 110 | 2E7B1D4821741247 |
|  | 111 | 7B2E481D74214712 |
| S2 | 0000 | 121D474821 2E747B1D1248 4721 7B742E21 47B1 21D47482 12E747B212 E27 48421 D14 7B7 12E27 8B8B12E247B721 D174 841 DED48B82EDE7B8B |
|  | 0001 | 4748121 D747B8B121 DE48471D127B742E2147B712E2147B121D474821 D148B81DED7B8B2EDE72EDE7B8B1DED48B82EDE |
|  | 0010 | 212E747B121D47482E217B741D124847 21 2E74 7B212E 2147 481 21D 12748421D147B712E27B8B2EDE48B81DED |
|  | 0011 | 747B212E47481 21 D7B742E2148471 2E747B212E 2147 4812 1 D7B 742E21 47B121D47482E217B741D124847 21 2E747B8B12E247B721D17484 |
|  | 0100 | 1D12484721D147B741 21 D4748212E747B212E2147481 21 D74 782E 2 17B 742 E21 4712 1D47482E217B742 E21484712 1D747B8B2EDE48B82EDE7B8B721D17484 |
|  | 0101 | 4847 1 D127B 741 21E 48471 D7B742E2148 472 E21 7B742 E21 484 71 D12 748 12 1D747B742 E21 4712 1D474 82 12 E74 7B1 21D 47482 E217B712E27482 12E247B7 |
|  | 0110 | 2E217B741D124847 21 2E747B212E47481 21 D747B 121D 48 472 1 2E 748 21 D174 7B121D4748 21 2E74 7B121D47482 12 E7 47B 8 21 D1 74841 2 E247B7 |
|  | 0111 | 7B742E2148471D127 47B212E47481 21 D7488 21 2 E747B 1 D1 2484 72 E217B74 1 D1 2484 72 E21 7B74 2 1 D1 24 847 1 2E7 47B 1D124 84721 D147B712E2 17B74 |
|  | 1000 | 12E247B721D17484 1 DED48B82EDE7B8B 121 D4 74821 2 E747B 1 D1 2484 72 E7 47B 21 2E48 471 D7 47B 212E4 74 8 21 2E 747B 21 2E4 7481 D12484 72 E217B74 |
|  | 1001 | 47B 71 2E274 8421 D14 8B 81 DED7B8B 2 EDE48B 82 1 2E7 47B 1 DE D48B 821 DE D74 7B 212E47481 21 D7B7 42E 147 48121D7 47B 21 2 E48471 D1 27B742E21 |
|  | 1010 | 21D17484 21 D14 8B 81 DED7 B8B 2 EDE 48B 8 21 E D747B 2 17 484 1 21 D1 48471D 1 27B 74 2E 21 74 B 2 1 D47 48 21 2 E747B 1 21 D4 7 4 82 E21 7B7 42E 21 |
|  | 1011 | 7 4842 1D147B712E27B8B2EDE 48B81DED74 7B212E474 48 12 1D7 B742 E21 47 4 81 21 D7B 742 E2148 471 D12 4847 1 D127B741D 1 24847 1 D12 |
|  | 1100 | 1DED48B82EDE7B8B1DED4 8B8 2 1D ED7 474 8 421 D17 48 41 21 D 12 4 847 21 E21 7B 74 1 21D 4 74 82 12 E74 7B 1 21D 4 74 82 1 2 E7 47B |
|  | 1101 | 48B81DED7B8B2EDE48B81DED 747B4 8 21 2 E 7 47B 12 1D 4 7 4 82 1 D1 4 8 47 1D1 2 7B 7 41 21 D4 74 8 21 2 E7 47B 12 1D 4 7 48 |
|  | 1110 | 2EDE7B8B1DED48B82EDE 4 8B 82 1 D1 7 4 84 21 D1 47 B7 12 E2 748 41 2E 2 47B 72 1 D1 74 84 1 2 E2 47 B 72 1 D1 7 48 |
|  | 1111 | 7B8B2EDE48B81DED748421D147B712E27B742E2148471D127 47 B 21 2 E4 7 48 121 D |

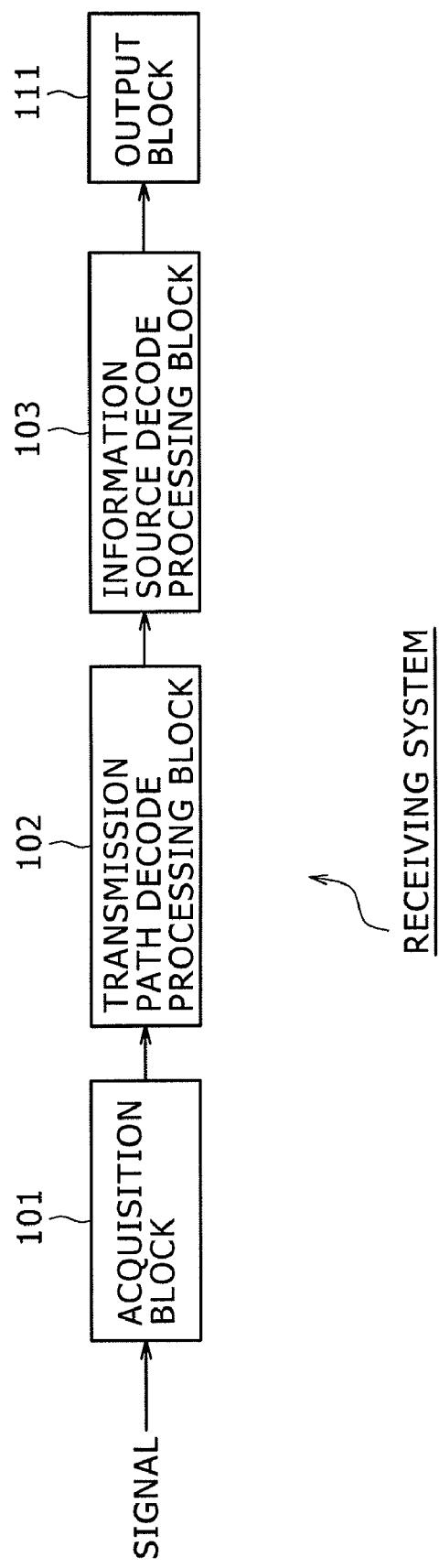

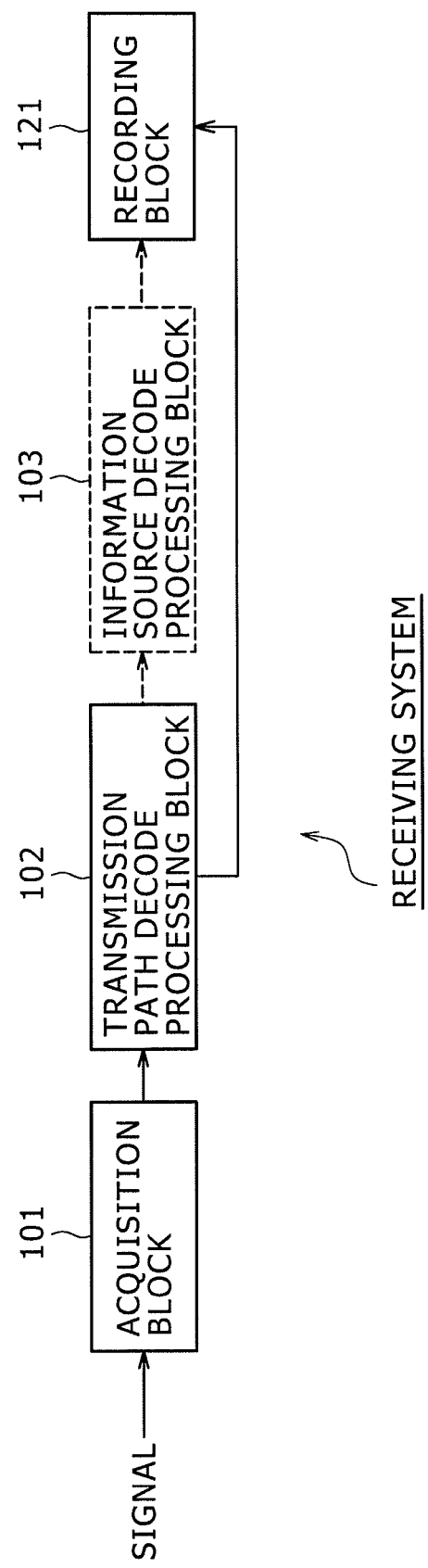

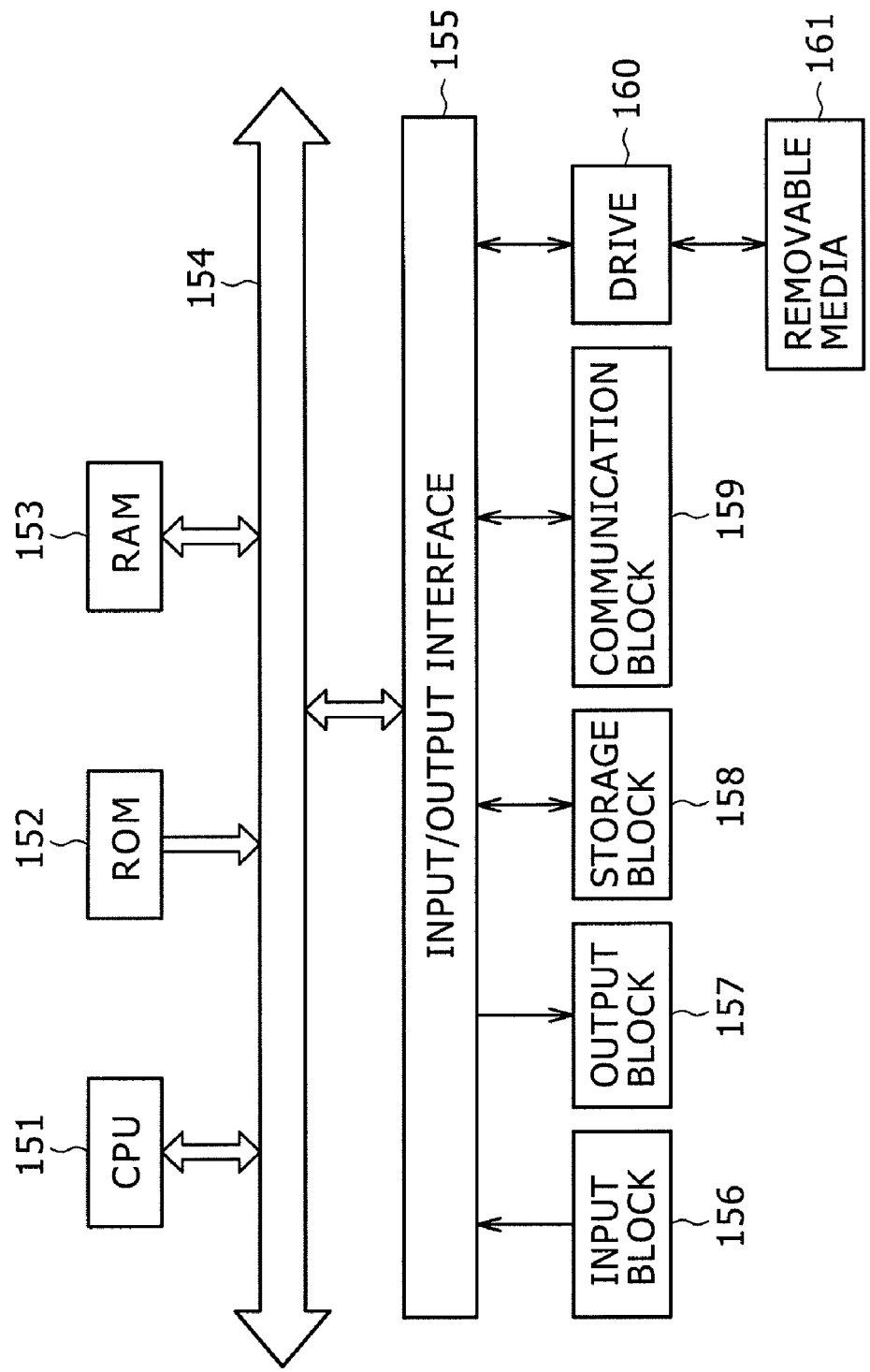

RECEIVING APPARATUS AND RECEIVING METHOD

BACKGROUND OF THE INVENTION

1. Field of the Invention

The present invention relates to a receiving apparatus and a receiving method and, more particularly, to a receiving apparatus and a receiving method that are configured to early and surely detect that a signal based on the DVB-T2 (Digital Video Broadcasting—Terrestrial 2) standard is not transmitted by a channel in reception, for example.

2. Description of the Related Art

With terrestrial digital broadcasting and so on, OFDM (Orthogonal Frequency Division Multiplexing) is used for data modulating.

With OFDM, many orthogonal subcarriers are arranged in a transmission band and digital modulation, such as PSK (Phase Shift Keying) or QAM (Quadrature Amplitude Modulation), is performed to allocate data to the amplitude and phase of each of these subcarriers.

As described above, in OFDM, data is allocated to two or more subcarriers, so that the modulation can be performed by performing IFFT (Inverse Fast Fourier Transform) which performs inverse Fourier transform; while the demodulation of an OFDM signal obtained as a result of the modulation can be performed by FFT (Fast Fourier Transform) which performs Fourier transform.

Therefore, a transmission apparatus configured to transmit OFDM signals can be configured by use of an IFFT computation circuit and a receiving apparatus configured to receive OFDM signals can be configured by use of an FFT computation circuit.

Terrestrial digital broadcast standards that use OFDM having the above-mentioned features include DVB-T2 (the second-generation European terrestrial digital broadcasting standard). For DVB-T2, refer to so-called DVB BlueBook A122: "Frame structure channel coding and modulation for a second generation digital terrestrial television broadcasting system (DVB-T2)," DVB Document A122 June 2008.

Terrestrial digital broadcasting standards based on OFDM define a unit called a frame which is composed of plural OFDM symbols, in which data is transmitted on the frame basis. The DVB-T2 standard also defines a frame called a T2 frame. Data is transmitted in the unit of this T2 frame.

Now, referring to FIG. 1, there is shown a T2 frame format.

As shown in FIG. 1, each T2 frame has a P1 symbol, a P2 symbol, and data symbols in this order.

The P1 symbol is a symbol for transmitting P1 signalling. The P1 symbol includes S1 and S2 transmission parameters. The parameters S1 and S2 are indicative in which of the schemes, SISO (Single Input, Single Output (meaning one transmission and one receiving antenna)) and MISO (Multiple Input, Single Output (meaning multiple transmitting antennas but one receiving antenna)), the P2 symbol is transmitted, an FFT size (the number of samples (or symbols) subject to one session of FFT computation) for FFT computation of P2, and so on.

The P2 symbol is a symbol for transmitting L1 pre-signalling and L1 post-signalling.

The purposes of the P1 symbol intended by the DVB-T2 standard include the following:

(a) the receiving apparatus early determines that a signal being received is a signal based on the DVB-T2 standard;

(b) the receiving apparatus identifies a preamble signal itself as a preamble signal of a frame based on the DVB-T2 standard;

(c) a transmission parameter necessary for the starting of demodulation is transmitted; and (d) the receiving apparatus is cable of performing frame positional detection and carrier error correction.

Referring to FIG. 2, there is shown a configuration of the P1 symbol.

As shown in FIG. 2, the P1 symbol has 1K (=1024) symbols as valid symbols. The P1 symbol has a structure in which signal C obtained by frequency-shifting a part of the beginning of valid symbol A by frequency $f_{SH}$ is copied to the front side of the valid symbol and signal B obtained by frequency-shifting the remaining part of valid symbol A by frequency $f_{SH}$ is copied to the rear of the valid symbol. Performing frequency shifting provides, on the basis of the standard, a mechanism in which it is difficult to erroneously detect an interference signal as the P1 symbol.

In the receiving apparatus, P1 symbol detection is performed by obtaining a correlation value for each section by use of the fact that the P1 symbol contains a copy of partial data thereof. For example, P1 symbol detection is performed in an initial scan for determining on which channel a DVB-T2 standard signal is transmitted. If the P1 symbol is detected, it is indicative that a DVB-T2 signal is being transmitted on the receiving channel; if the P1 symbol is not detected, it is indicative that a DVB-T2 signal is not being transmitted on the receiving channel. In what follows, a DVB-T2 signal is appropriately referred to as a T2 signal.

Exemplary Configuration of a Receiving Apparatus

Referring to FIG. 3, there is shown a block diagram illustrating a related-art receiving apparatus.

A receiving apparatus 1 has a P1 detection block 11, a delay block 12, a frequency correction block 13, an FFT computation block 14, a CDS (Carrier Distribution Sequence) correlation computation block 15, a decode section 16, a TS signal presence/absence determination block 17, and a control block 18. The P1 detection block 11 has a correlation value computation portion 11A. The decode section 16 has a coarse correction/descramble processing block 21, a DBPSK demodulation block 22, an S1 demodulation block 23, and an S2 demodulation block 24.

Frequency conversion, A/D conversion, and quadrature demodulation are performed on an RF signal supplied from an antenna. A resultant OFDM signal is supplied to the P1 detection block 11 and the delay block 12 as an input signal. This input signal is a complex signal containing an in-phase component (I component) and a quadrature-phase component (Q component) and an OFDM signal of time domain before FFT computation is performed.

The P1 detection block 11 computes a correlation value for each section of the input signal in the correlation value computation portion 11A, thereby detecting a P1 symbol. The maximum value of the correlation values computed by the correlation value computation portion 11A is supplied to the T2 signal presence/absence determination block 17. Details of the computation of correlation values performed by the correlation value computation portion 11A will be described later.

If the P1 symbol has been detected on the basis of the correlation value for each section, the P1 detection block 11 sets a start position of FFT computation with reference to the position of the detected P1 symbol, thereby outputting information indicative of the set position to the FFT computation block 14.

In addition, the P1 detection block 11 detects a frequency carrier frequency offset) in a carrier interval and outputs a fine offset value that is information indicative of the detected frequency offset to the frequency correction block 13.

According to the DVB-T2 Implementation Guidelines (ETSI TR 102 831: IG), the P1 symbol allows the detection of a "fine" frequency offset having an accuracy of ±0.5× subcarrier interval.

The delay block 12 delays an OFDM signal supplied as an input signal by a period of time required for the P1 detection block 11 to detect the P1 symbol, for example, and supplies the delayed OFDM signal to the frequency correction block 13.

On the basis of the file correction value supplied from the P1 detection block 11, the frequency correction block 13 corrects the frequency offset of the OFDM signal supplied from the delay block 12 and outputs the corrected OFDM signal to the FFT computation block 14.

Using the position set by the P1 detection block 11 as the start position, the FFT computation block 14 performs FFT computation on the OFDM signal (a symbol of valid symbol length) supplied from the frequency correction block 13. The FFT computation provides the data transmitted by subcarrier, namely, an OFDM signal that is representative of a symbol on IQ constellation. The OFDM signal in the frequency domain obtained by the FFT computation is supplied to the CDS correlation computation block 15.

The CDS correlation computation block 15 computes a correlation value between a subcarrier sequence having a power of the OFDM signal supplied from the FFT computation block 14 and a known CDS. In the OFDM signal of the frequency domain obtained by performing FFT computation on the P1 symbol signal, the subcarriers having a power are allocated to only a frequency defined by the known sequence. Details of the known sequence will be described later.

The CDS correlation computation block 15 detects the P1 symbol on the basis of the detected correlation values and outputs the maximum correlation value to the T2 signal presence/absence determination block 17. For example, a section of subcarrier sequence having the maximum correlation value with the known sequence and having a power is detected as a P1 symbol section.

In what follows, the correlation value for each OFDM signal section in the time domain computed by the correlation value computation portion 11A of the P1 detection block 11 is referred to as a signal section correlation value and the correlation value computed by the CDS correlation computation block 15 is referred to as a CDS correlation value. The maximum value of the signal section correlation values is referred to as a signal section correlation peak value and the maximum value of the CDS correlation values is referred to as a CDS correlation peak value.

If the OFDM signal supplied from the FFT computation block 14 is a P1 symbol signal, the CDS correlation computation block 15 detects a coarse carrier frequency offset for each carrier. According to the Implementation Guidelines of the DVB-T2 standard (ETSI TR 102 831: IG), the detection of "coarse" frequency offset in units of subcarrier interval is enabled by use of the correlation with the known sequence of P1 symbols.

The CDS correlation computation block 15 outputs the FFT-computed OFDM signal and the coarse correction value that is information indicative of the detected frequency offset to the coarse correction/descramble processing block 21.

The coarse correction/descramble processing block 21 corrects the frequency offset of the OFDM signal supplied from the CDS correlation computation block 15 on the basis of the coarse correction value and outputs an OFDM signal obtained by performing descramble and so on to the DBPSK demodulation block 22.

The DBPSK demodulation block 22 performs DBPSK demodulation on the OFDM signal supplied from the coarse correction/descramble processing block 21. Of the signal point sequences obtained by the DBPSK demodulation, the DBPSK demodulation block 22 outputs the sequence of a S1 part contained in the P1 symbol to the S1 demodulation block 23 and outputs the sequence of a S2 part to the S2 demodulation block 24.

The S1 demodulation block 23 computes correlation values between the signal point sequence supplied from the DBPSK demodulation block 22 and eight types of known sequences corresponding to the 3-bit S1 defined by the DVB-T2 standard. Details of these known sequences will be described later. The S1 demodulation block 23 selects, as S1, a 3-bit value corresponding to a known sequence with the maximum correlation value obtained of the eight types and outputs the selected 3-bit value.

The S2 demodulation block 24 computes correlation values between the signal point sequence supplied from the DBPSK demodulation block 22 and 16 types of known sequences corresponding to the 4-bit S2 defined by the DVB-T2 standard. The S2 demodulation block 24 selects, as S2, a 4-bit value corresponding to the known sequence with the maximum correlation value obtained of the 16 types and outputs the selected 4-bit value.

On the basis of the S1 outputted from the S1 demodulation block 23 and the S2 outputted from the S2 demodulation block 24, various kinds of processing operations will be performed in subsequent circuits.

On the basis of the signal section correlation peak value supplied from the correlation value computation portion 11A and the CDS correlation peak value supplied from the CDS correlation computation block 15 at the time of the initial scan, the T2 signal presence/absence determination block 17 determines whether or not the T2 signal is being transmitted on the receiving channel. If the T2 signal is found not being transmitted on the receiving channel, then the T2 signal presence/absence determination block 17 outputs a T2 "absence" flag that is a signal indicative thereof.

The control block 18 controls the entire operation of the receiving apparatus 1 that includes the configuration shown in FIG. 3. For example, the receiving channel is controlled by the control block 18.

Flow of the Initial Scan

The following describes the processing to be performed by the receiving apparatus 1 at the time of the initial scan with reference to flowcharts shown in FIG. 4 and FIG. 5.

FIG. 4 and FIG. 5 partially show the processing to be performed at the initial scan described in index figure 74 of the Implementation Guidelines of the DVB-T2 standard (ETSI TR 102 831: IG). The initial scan is performed to check if there is a T2 signal in a tunable frequency band when the power supply is first turned on, for example.

In step S1, the control block 18 controls a tuner, not shown, to select the bandwidth of a channel to be received from among two or more bandwidths, such as 6 MHz, 7 MHz, and 8 MHz.

In step S2, the control block 18 sets the center frequency of the channel to be received. When the bandwidth of the channel is selected and the center frequency of the channel having the selected bandwidth is set, an OFDM signal is entered in the P1 detection block 11 and the delay block 12.

In step S3, the P1 detection block 11 computes a signal section correlation value for each section of an input signal in the correlation value computation portion 11A, thereby detecting a P1 symbol. A signal section correlation peak value computed by the correlation value computation portion 11A is supplied to the T2 signal presence/absence determination block 17.

In step S4, T2 signal presence/absence determination block 17 determines whether or not a P1 symbol has been detected. For example, if a signal section correlation peak value equal to or higher than a threshold value has been detected in a predetermined section, the T2 signal presence/absence determination block 17 determines that a P1 symbol has been detected.

If a P1 symbol is found detected in step S4, then the P1 detection block 11 sets the position at which the signal section correlation peak value has been detected to the beginning of the T2 frame in step S5. The P1 detection block 11 sets the start position of FFT computation with reference to the position (the beginning of the T2 frame) of the P1 symbol and outputs information indicative of the FFT computation start position to the FFT computation block 14. In addition, the P1 detection block 11 detects a frequency offset in the carrier interval and outputs a fine offset value to the frequency correction block 13.

The OFDM signal delayed by the delay block 12 and frequency-offset-corrected by the frequency correction block 13 based on the fine offset value is supplied to the FFT computation block 14.

In step S6, the FFT computation block 14 performs FFT computation on the OFDM signal of P1 signal supplied from the frequency correction block 13. The OFDM signal of the frequency domain obtained by the FFT computation is supplied to the CDS correlation computation block 15.

In step S7, the CDS correlation computation block 15 computes a CDS correlation value on the basis of the FFT-computed OFDM signal and a known sequence, thereby detecting a P1 symbol. A CDS correlation peak value computed by the CDS correlation computation block 15 is supplied to the T2 signal presence/absence determination block 17.

In step S8, the T2 signal presence/absence determination block 17 determines whether or not the CDS correlation peak value is equal to or higher than a threshold value and the P1 symbol has been detected by the CDS correlation computation block 15.

If the CDS correlation peak value is found to be below the threshold value in step S8 or, if a P1 symbol is found not detected in step S4, then the control block 18 determines whether or not a time-out has occurred in step S9.

If a time-out is found not encountered in step S9, then the procedure returns to step S3 to repeat the detection of a P1 symbol on the basis of a signal section correlation value. The period of time for one T2 frame is 250 ms at maximum. If a T2 signal is being transmitted on a channel in reception, a P1 symbol is detected every 250 ms. Therefore, here, if a time from the start of the detection of P1 symbol in step S3 has passed a predetermined time obtained by adding 250 ms to a margin, then a time-out is determined to have occurred; otherwise, no time-out is determined to have occurred.

If a time-out is determined to have occurred in step S9, then the control block 18 determines whether or not there remains any unset center frequency in step S10.

If an unset center frequency is found remaining in step S10, then the procedure returns to step S2, in which the control block 18 sets a new frequency as a center frequency, thereby repeating the processing mentioned above.

On the other hand, if an unset center frequency is found not remaining in step S10, then the control block 18 determines whether or not there remains any unselected bandwidth in step S11.

If an unselected bandwidth is found remaining in step S11, then the procedure returns to step S1, in which the control block 18 selects a new bandwidth, thereby repeating the processing mentioned above.

On the other hand, if an unselected bandwidth is found not remaining in step S11, then the control block 18 ends the above-mentioned initial scan processing.

If the CDS correlation peak value is higher than the threshold and a P1 symbol is found detected in step S8, then the CDS correlation computation block 15 detects a frequency offset for each carrier on the basis of the CDS correlation value in step S12. Further, the CDS correlation computation block 15 outputs the FFT-computed OFDM signal and the coarse correction value to the coarse correction/descramble processing block 21.

In step S13, the coarse correction/descramble processing block 21 corrects the frequency offset of the OFDM signal on the basis of the coarse correction value, thereby performing descramble processing and so on.

In sep S14, the decode section 16 decodes S1 and S2. To be more specific, the DBPSK demodulation block 22 executes DBPSK demodulation on the OFDM signal with the frequency offset correction and so on performed by the coarse correction/descramble processing block 21. The S1 demodulation block 23 and the S2 demodulation block 24 compute correlation values between a signal point sequence supplied from the DBPSK demodulation block 22 and known sequences.

In step S15, the S1 demodulation block 23 selects S1 on the basis of the computed correlation value and the S2 demodulation block 24 selects S2 on the basis of the computed correlation value. S1 selected by the S1 demodulation block 23 and S2 selected by the S2 demodulation block 24 are also supplied to the control block 18.

In step S16, the control block 18 determines whether or not S1 selected by the S1 demodulation block 23 is "00X" (X being 0 or 1).

In the DVB-T2 standard, 3 bits of S1 being "00X" is indicative that a frame including this S1 is a T2 frame. The 3 bits of S1 being other than "00X" is indicative of the frame including this S1 is not a T2 frame but an FEF (Future Extension Frame). The FEF is a frame for extension specified in the DVB-T2 standard.

If the S1 selected by the S1 demodulation block 23 is found to be not "00X" in step S16, then the control block 18 determines whether or not the S2 selected by the S2 demodulation block 24 is "XXX1" in step S17.

In the DVB-T2 standard, 4 bits of S2 being "XXX1" is indicative that a T2 frame and an FEF exist together on the channel being received.

If the S1 selected by the S1 demodulation block 23 is found to be "00X" in step S16 or the S2 selected by the S2 demodulation block 24 is found to be "XXX1" in step S17, then the processing is further continued.

For example, the S1 selected by the S1 demodulation block 23 is found to be "00X" in step S16, then it is determined whether or not the S2 is "XXX1" (not shown). If the S2 is found to be not "XXX1" in this determination, then the channel being received is determined to be a channel that is transmitting only T2 signals. If the S2 is found to be "XXX1," then the channel being received is determined to be a channel on which both a T2 signal and an FEF exist together. Next, as information associated with the channel transmitting T2 signals, the center frequency and bandwidth of the channel being received are stored by the control block 18.

Meanwhile, if the S2 is found to be not "XXX1" in step S17, then the processing goes back to step S10 in FIG. 4 and the above-described processing operations are repeated.

FIG. 6 shows a flowchart mainly indicative of the processing to be executed by the T2 signal presence/absence determination block 17 in the processing to be executed at the time of the initial scan described with reference to FIG. 4 and FIG. 5.

In step S31, the T2 signal presence/absence determination block 17 waits until the input signal is stabilized. When the input signal is stabilized due to a normal operation of ABC for example, a signal stabilization flag indicative thereof is supplied to the T2 signal presence/absence determination block 17.

When a signal stabilization flag is supplied, then the T2 signal presence/absence determination block 17 waits for a period of time equivalent to 250+α (ms) in step S32. It should be noted here that 250 ms is indicative of a maximum length (time) of the T2 frame and α is indicative of a preset margin time. It should also be noted that, of the processing operations to be performed in step S31 and step S33, the processing of step S31 is to be performed before the process of step S3 in FIG. 4, the processing of step S32 corresponds to the processing to be executed during a period of time in which the control block 18 determines whether or not a time-out has occurred in step S9 shown in FIG. 4.

In step S33, the T2 signal presence/absence determination block 17 compares the signal section correlation peak value with the threshold value like the processing of step S4 shown in FIG. 4, thereby determining whether or not a P1 symbol has been detected.

If the signal section correlation peak value is found to be equal to or higher than the threshold value within a predetermined section and a P1 symbol is found detected in step S33, then the T2 signal presence/absence determination block 17 determines in step S34 whether or not the CDS correlation peak value is equal to or higher than the threshold value like the processing of step S8 shown in FIG. 4. It should be noted that, before the processing of step S34, the processing operations of step S5 through step S7 shown in FIG. 4 are performed.

If a P1 symbol is found not detected in step S33 or the CDS correlation peak value is found to be below the threshold value in step S34, then the processing to be performed when there is no T2 signal in the channel being received is performed in step S35. Namely, the processing to be performed when NO is determined in step S4 or step S8 shown in FIG. 4 is performed.

On the other hand, if the CDS correlation peak value is found to be equal to or higher than the threshold value in step S34, then the processing to be performed when it is possible that the channel contains a T2 signal is performed in step S36. Namely, the processing operations beginning with step S12 shown in FIG. 5 are performed.

As described above, the determination itself for checking whether or not there is a T2 signal by use of a P1 symbol is intended by the standard. In addition, in the initial scan, the determination for checking if there is a T2 signal (a P1 symbol) or not by use of a CDS correlation peak value is explicitly shown in the Implementation Guidelines (ETSI TR 102 831: IG) of the DVB-T2 standard.

SUMMARY OF THE INVENTION

Quickly execution of the initial scan processing is desirable with respect to a shortened user wait time. It is effective for the high-speed initial scan processing to early and surely detect that there is no T2 signal on the channel being received. The early detection of the absence of a T2 signal on the channel being received allows the sequential switching between channels to be scanned and between bandwidths, thereby shortening a time required for the entire processing of initial scan.

It should be noted here that an erroneous decision that there is no T2 signal while there is actually a T2 signal cannot be allowed because a channel that can be received is missed.

On the other hand, an erroneous decision that there is a T2 signal while there is actually no T2 signal is not desirable either although it is more allowable than the erroneous decision that there is no T2 signal while a T2 signal actually exists. If a T2 signal is erroneously determined existing on the basis of a signal section correlation peak value and a CDS correlation peak value, the processing operations beginning with step S12 shown in FIG. 5 are performed, thereby taking a time until the switching between the channels to be scanned.

Although the P1 symbol is robust with respect to the standard and therefore less susceptible to the influence of interference signals, it is possible in an environment exposed to interference signals that, if there is actually no T2 signal, each correlation value for use in the determination of the presence or absence of a T2 signal indicates a value higher than the normal level, thereby presenting an erroneous decision that there is a T2 signal. The interference signals include an analog communication signal and a clock signal, for example.

In order to surely prevent the erroneous decision that there is no T2 signal while there actually exists a T2 signal, the threshold value for use in the decision of the presence or absence of a T2 signal may be set relatively low. However, setting the this threshold relatively low makes higher the possibility of the erroneous decision that there is a T2 signal while there actually does not exists a T2 signal.

Therefore, the present invention addresses the above-identified and other problems associated with related-art methods and apparatuses and solves the addressed problems by providing a receiving apparatus and a receiving method that are configured to early and surely detect that no signal based on DVB-T2 is being transmitted on a channel being received.

In carrying out the invention and according to one embodiment thereof, there is provided a receiving apparatus. This receiving apparatus includes first correlation value computation means for receiving an orthogonal frequency division multiplexing signal based on a predetermined standard for transmitting data in unit of a frame arranged, at a beginning of the frame, with a preamble signal having a correlation between a first section and a second section that are parts of an entire signal, thereby computing a first correlation value which is a correlation value of signals in two sections separated from each other by a time equal to a time interval between the first section and the second section. The apparatus further includes operation means for performing Fourier transform processing on the preamble signal including the signals of the two sections with the first correlation value equal to or higher than a threshold value obtained, thereby generating the orthogonal frequency division multiplexing signal of frequency domain. The apparatus further includes second correlation value computation means for computing a second correlation value which is a correlation value between a sequence of subcarriers for use in data transmission among subcarriers of the orthogonal frequency division multiplexing signal of frequency domain and a known sequence. The apparatus further includes decoding means for computing a third correlation values, each of the third correlation values being a correlation value between data transmitted by subcarriers of a sequence with the second correlation value with the known sequence equal to or higher than a threshold value and a plurality of known items of data having the same number of bits as a bit train indicative of a transmission parameter for use in the demodulation of a signal subsequent to the preamble signal, thereby decoding known data having a maximum value of the third correlation values as the transmission parameter. The apparatus further includes determination means for determining whether the maximum value of the third correlation values computed by the decoding means is less than a predetermined threshold value and, if the maximum value is found to be less than the predetermined threshold value, outputting a signal indicative that the orthogonal frequency division multiplexing signal based on the predetermined standard is not being transmitted on a channel being received.

In the above-mentioned receiving apparatus, if the maximum value of the first correlation value is higher than a first threshold value and the maximum value of the second correlation value is higher than a second threshold value, the determination means makes comparison between a maximum value of a plurality of the third correlation values and the predetermined threshold value.

In the above-mentioned receiving apparatus, the predetermined standard is the DVB-T2 standard and the preamble signal is a P1 symbol.

In the above-mentioned receiving apparatus, the decoding means includes first decoding means for computing a correlation value between data transmitted by subcarriers of a sequence with the second correlation value with the known sequence equal to or higher than a threshold value and eight types of 3-bit data making up S1 in the digital video broadcasting—terrestrial 2 standard, thereby decoding the 3-bit data having a highest correlation value as S1. The decoding means further includes second decoding means for computing a correlation value between data transmitted by subcarriers of a sequence with the second correlation value with the known sequence equal to or higher than a threshold value and 16 types of 4-bit data making up S2 in the digital video broadcasting—terrestrial 2 standard, thereby decoding the 4-bit data having a highest correlation value as S2.

In the above-mentioned receiving apparatus, if a maximum value in a plurality of correlation values computed by the first decoding means and a maximum value of a plurality of correlation values computed by the second decoding means are less than the predetermined threshold value, the determination means outputs a signal indicative that the orthogonal frequency division multiplexing signal of the predetermined standard is not being transmitted on a channel being received.

In carrying out the invention and according to a second embodiment thereof, there is provided a receiving method. This receiving method includes a step of receiving an orthogonal frequency division multiplexing signal based on a predetermined standard for transmitting data in unit of a frame arranged, at a beginning of the frame, with a preamble signal having a correlation between a first section and a second section that are parts of an entire signal, thereby computing a first correlation value that is a correlation value of signals in two sections separated from each other by a time equal to a time interval between the first section and the second section. This receiving method further includes a step of performing Fourier transform processing on the preamble signal including the signals of the two sections with the first correlation value equal to or higher than a threshold value obtained, thereby generating the orthogonal frequency division multiplexing signal of frequency domain. This receiving method further includes a step of computing a second correlation value which is a correlation value between a sequence of subcarriers for use in data transmission among subcarriers of the orthogonal frequency division multiplexing signal of frequency domain and a known sequence. This receiving method further includes a step of computing third correlation values, each of the third correlation values being a correlation value between data transmitted by subcarriers of a sequence with the second correlation value with the known sequence equal to or higher than a threshold value and a plurality of known items of data having the same number of bits as a bit train indicative of a transmission parameter for use in the demodulation of a signal subsequent to the preamble signal, thereby decoding known data having a maximum value of the third correlation values as the transmission parameter. This receiving method further includes a step of determining whether the maximum value of the plurality of third correlation values computed in the decoding step is less than a predetermined threshold value and, if the maximum value is found to be less than the predetermined threshold value, outputting a signal indicative that the orthogonal frequency division multiplexing signal based on the predetermined standard is not being transmitted on a channel being received.

In one embodiment of the present invention, an orthogonal frequency division multiplexing signal based on a predetermined standard for transmitting data in unit of a frame arranged, at a beginning of the frame, with a preamble signal having a correlation between a first section and a second section that are parts of an entire signal is received, thereby computing a first correlation value that is a correlation value of signals in two sections separated from each other by a time equal to a time interval between the first section and the second section; Fourier transform processing is performed on the preamble signal including the signals of the two sections with the first correlation value equal to or higher than a threshold value obtained, thereby generating the orthogonal frequency division multiplexing signal of frequency domain. In addition, a second correlation value is computed that is a correlation value between a sequence of subcarriers for use in data transmission among subcarriers of the orthogonal frequency division multiplexing signal of frequency domain and a known sequence; third correlation values are computed, each of which is a correlation value between data transmitted by subcarriers of a sequence with the second correlation value with the known sequence equal to or higher than a threshold value and a plurality of known items of data having the same number of bits as a bit train indicative of a transmission parameter for use in the demodulation of a signal subsequent to the preamble signal, thereby decoding known data having a maximum value of the third correlation values as the transmission parameter. Further, it is determined whether the maximum value of the third correlation values computed in the decoding step is less than a predetermined threshold value and, if the maximum value is found to be less than the predetermined threshold value, a signal indicative that the orthogonal frequency division multiplexing signal based on the predetermined standard is not being transmitted on a channel being received is outputted.

As described and according to the present invention, that a signal based on the DVB-T2 standard is not transmitted on a channel being received can be early and surely detected.

BRIEF DESCRIPTION OF THE DRAWINGS

FIG. 11 is a diagram illustrating a power of an OFDM signal of a P1 symbol;

FIG. 12 is a diagram illustrating known sequences of S1 and S2;

FIG. 15 is a block diagram illustrating an exemplary configuration of a second form of receiving system applied with the receiving apparatus of the present invention;

FIG. 16 is a block diagram illustrating an exemplary configuration of a third form of receiving system applied with frequency and phase synchronization circuit of the present invention; and FIG. 17 is a block diagram illustrating an exemplary hardware configuration of a computer.

DETAILED DESCRIPTION OF THE PREFERRED EMBODIMENTS

This invention will be described in further detail by way of embodiments thereof with reference to the accompanying drawings. Now, with reference to FIG. 7, there is shown a block diagram illustrating an exemplary configuration of a receiving apparatus 1 practiced as one embodiment of the present invention.

Figure 3:
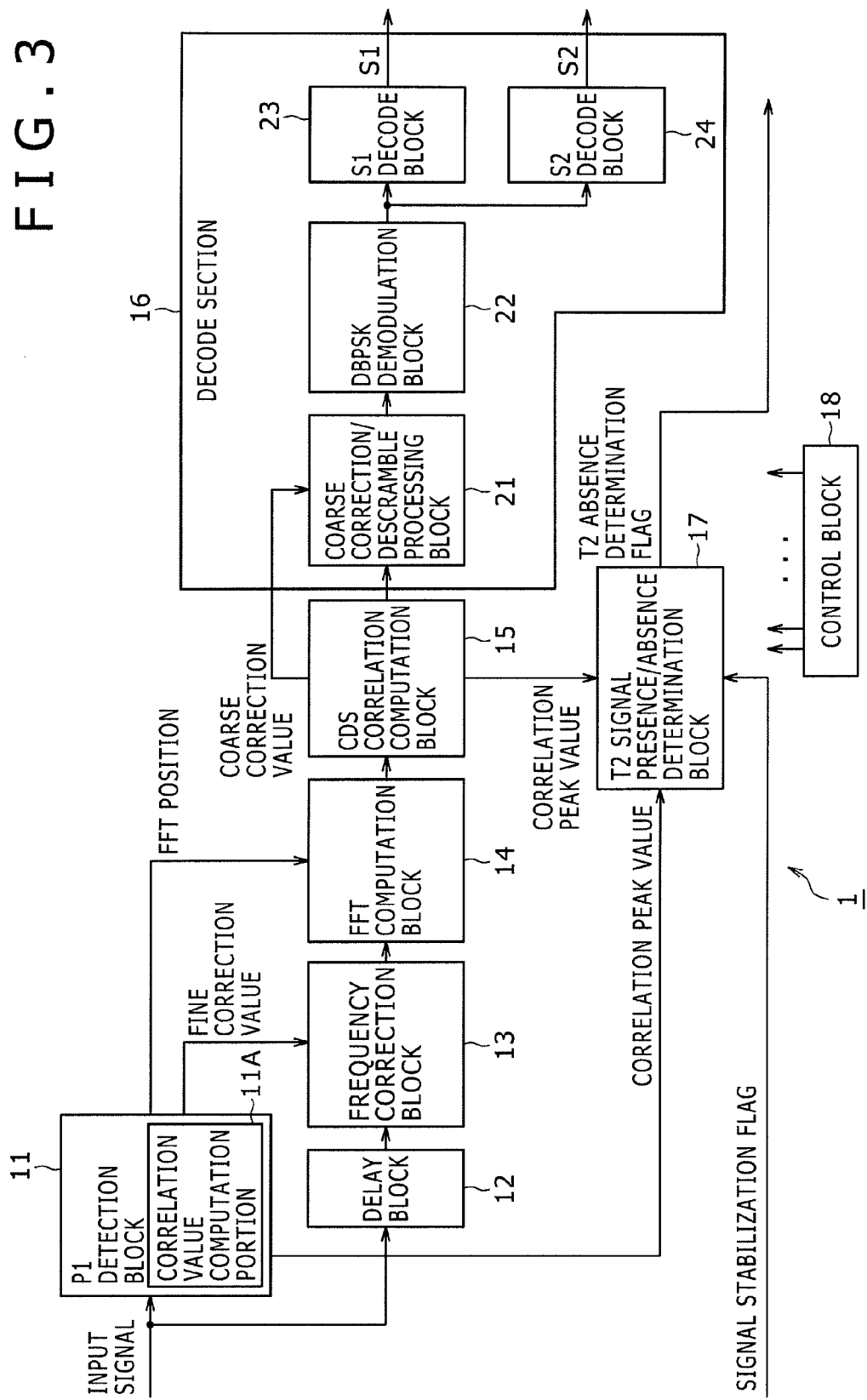
FIG. 3 is a block diagram illustrating a configuration of a related-art receiving apparatus.
Figure 7:
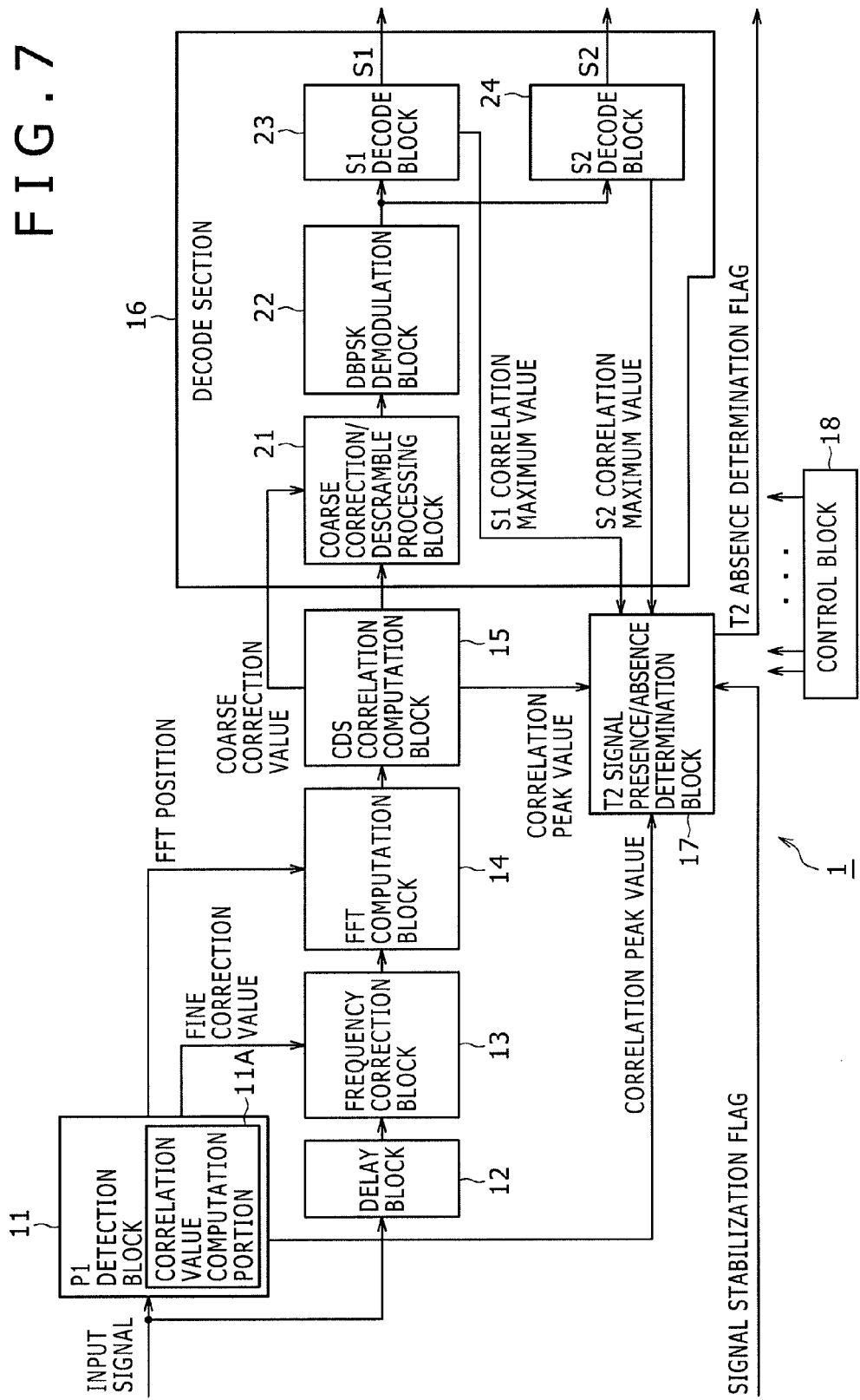
FIG. 7 is a block diagram illustrating an exemplary configuration of a receiving apparatus practiced as one embodiment of the invention.

With reference to FIG. 7, components similar to those previously described with reference to FIG. 3 are denoted by the same reference numerals. The description that is duplicate with that done with reference to FIG. 3 will be appropriately skipped.

The configuration of the receiving apparatus 1 shown in FIG. 7 is substantially the same as that shown in FIG. 3 except that a maximum value of the correlation values with a known sequence computed at the selection of S1 and a maximum value of the correlation values with a known sequence computed at the selection of S2 are supplied to a T2 signal presence/absence determination block 17.

Figure 2:
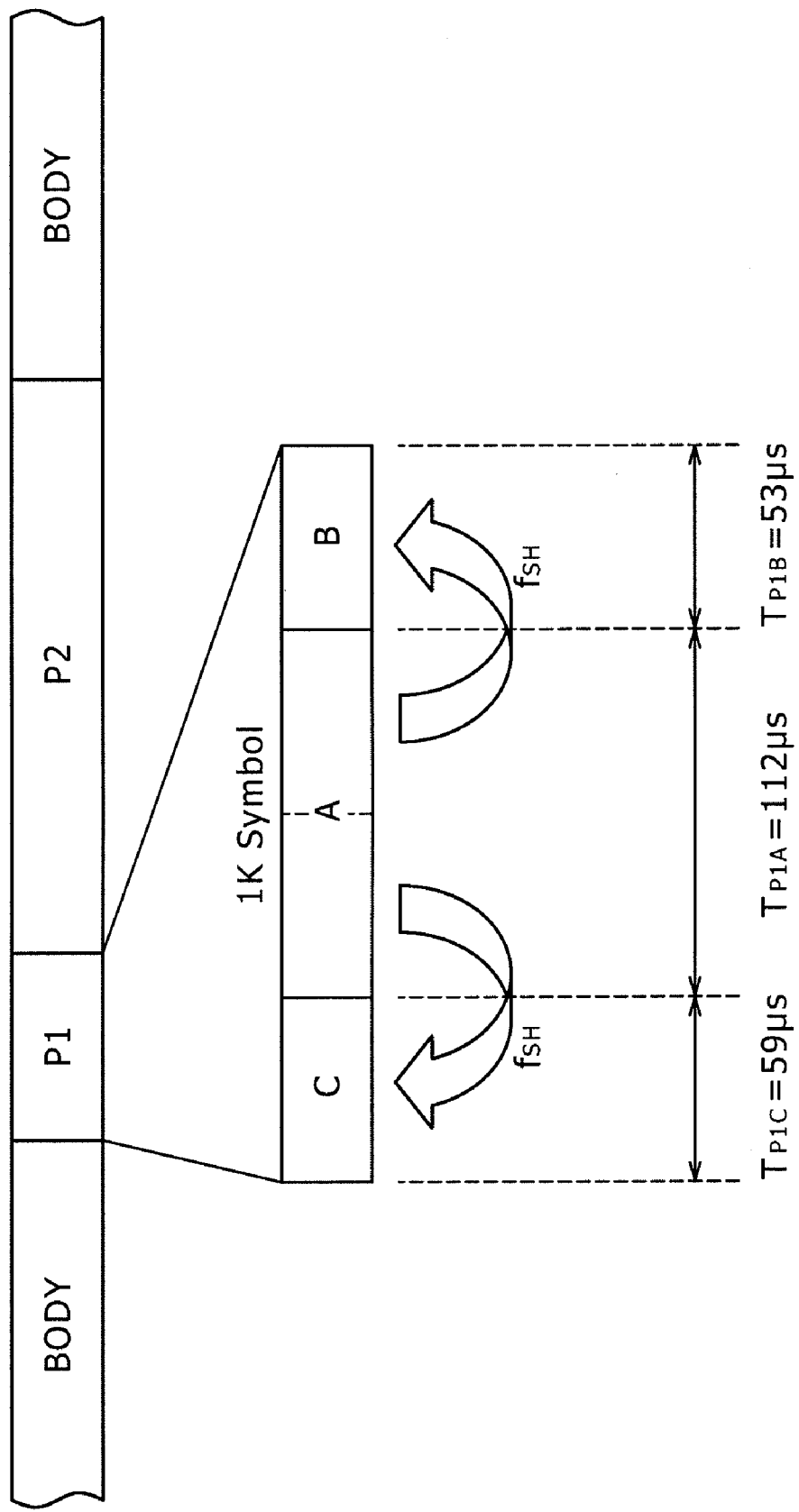
FIG. 2 is a diagram illustrating a configuration of a P1 symbol.

A P1 detection block 11 detects a P1 symbol from an input signal. As described before with reference to FIG. 2, there is a correlation between a part of the beginning side of a valid symbol A making up a P1 symbol and signal C copied in front of valid symbol A and a correlation between the remaining part of valid symbol A and signal B copied to the rear of valid symbol A. A P1 symbol is detected by use of that a P1 symbol has a correlation between a signal in one section of the P1 symbol and a signal in another section.

Figure 8:
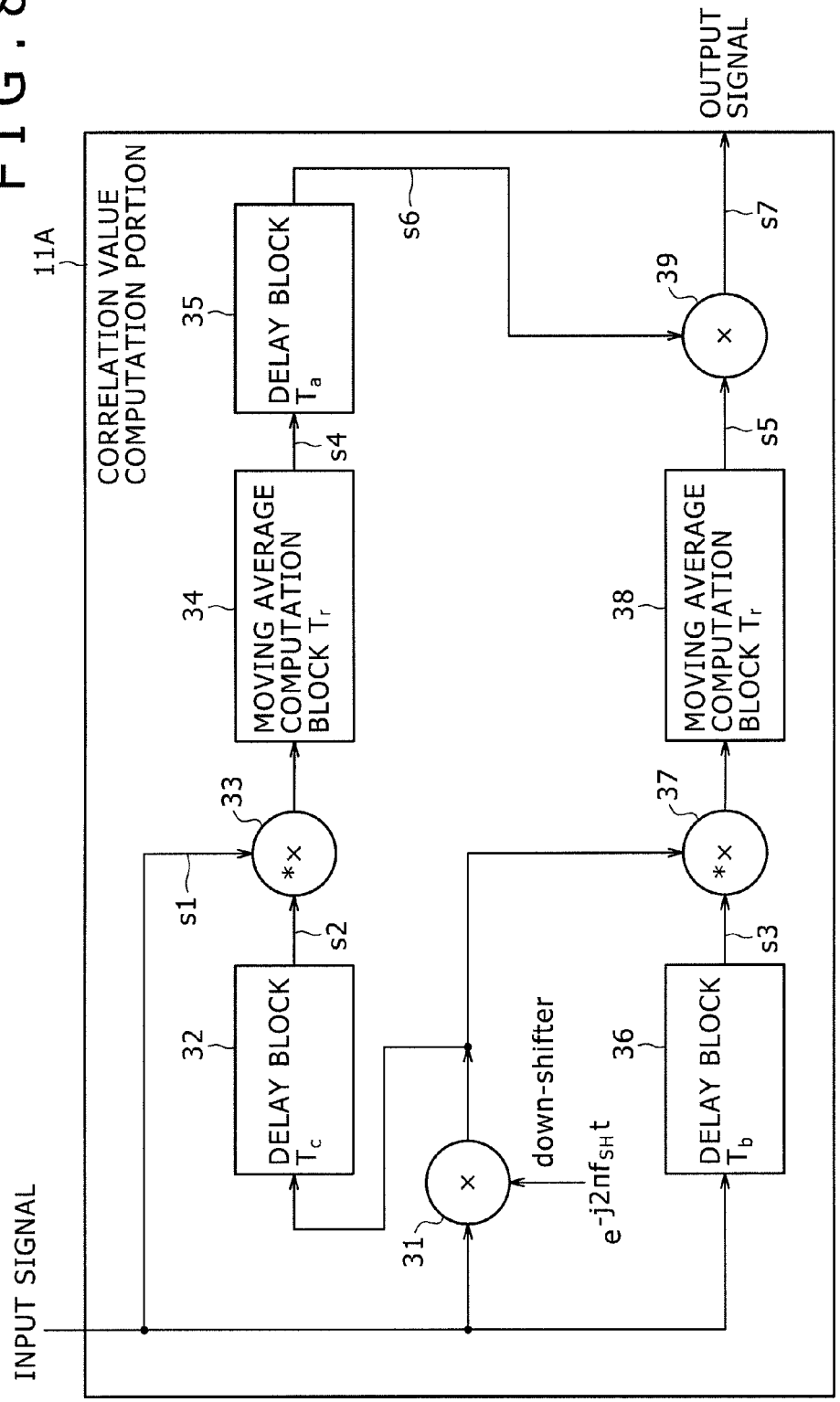
FIG. 8 is a block diagram illustrating an exemplary configuration of a correlation value computation portion shown in FIG. 7.

Referring to FIG. 8, there is shown an exemplary configuration of a correlation value computation portion 11A of the P1 detection block 11.

The correlation value computation portion 11A is made up of a frequency shift block 31, a delay block 32, a multiplication block 33, a moving average computation block 34, a delay block 35, a delay block 36, a multiplication block 37, a moving average computation block 38, and a multiplication block 39. In each of the blocks of the correlation value computation portion 11A, for every predetermined section of an input OFDM signal, the processing is executed by sequentially switching between the subject sections.

By multiplying the input signal by signal $e^{-j2\pi f_{SH}t}$, the frequency shift block 31 performs frequency conversion of the input signal such that the frequency of the input signal is lowered by $f_{SH}$. If a section subject to the processing is a section of a P1 symbol, the frequencies of signal C and signal B shown in FIG. 2 became the same frequency of the signal of the copy source. As described with reference to FIG. 2, signal C copied in front of a valid symbol making up the P1 symbol is a signal obtained by raising the signal of the copy source by $f_{SH}$. Meanwhile, signal B copied in the back of the valid symbol is a signal obtained by raising the signal of the copy source by $f_{SH}$.

The frequency shift block 31 outputs the frequency converted input signal to the delay block 32 and the multiplication block 37.

The delay block 32 delays the input signal supplied from the frequency shift block 31 from time Tc equal to a period of time (length) of signal C of the P1 symbol and outputs the delayed signal to the multiplication block 33.

The multiplication block 33 multiplies input signal s1 by signal s2 supplied from the delay block 32 and outputs a signal representative of a multiplication result to the moving average computation block 34.

The moving average computation block 34 obtains a moving average value of the multiplication result obtained by the multiplication block 33 and outputs an obtained moving average value to the delay block 35 as signal s4 representative of a correlation value.

The delay block 35 delays signal s4 supplied from the moving average computation block 34 such that signal s6 to be outputted from the delay block 35 is entered in the multiplication block 39 at the same time signal s5 outputted from the moving average computation block 38 is entered in the multiplication block 39. The delay block 35 outputs delayed signal s6 to the multiplication block 39.

The delay block 36 the input signal by period of time Tb equal to a period of time of signal B of the P1 symbol and outputs delayed signal s3 to the multiplication block 37.

The multiplication block 37 multiplies the signal supplied from the frequency shift block 31 by signal s3 supplied from the delay block 36 and outputs a signal representative of a multiplication result to the moving average computation block 38.

The moving average computation block 38 obtains a moving average value of the multiplication result provided by the multiplication block 37 and outputs a signal representative of the obtained moving average value to the multiplication block 39 as signal s5 representative of a correlation value.

The multiplication block 39 multiplies signal s6 supplied from the delay block 35 by signal s5 supplied from the moving average computation block 38 and outputs signal s7 representative of a multiplication result. On the basis of the signal outputted from the multiplication block 39, a signal section correlation peak value that is the peak value of the correlation value, an FFT position, and a fine correction value are obtained in another configuration, not shown, of the P1 detection block 11, and supplied to other blocks.

Figure 9:
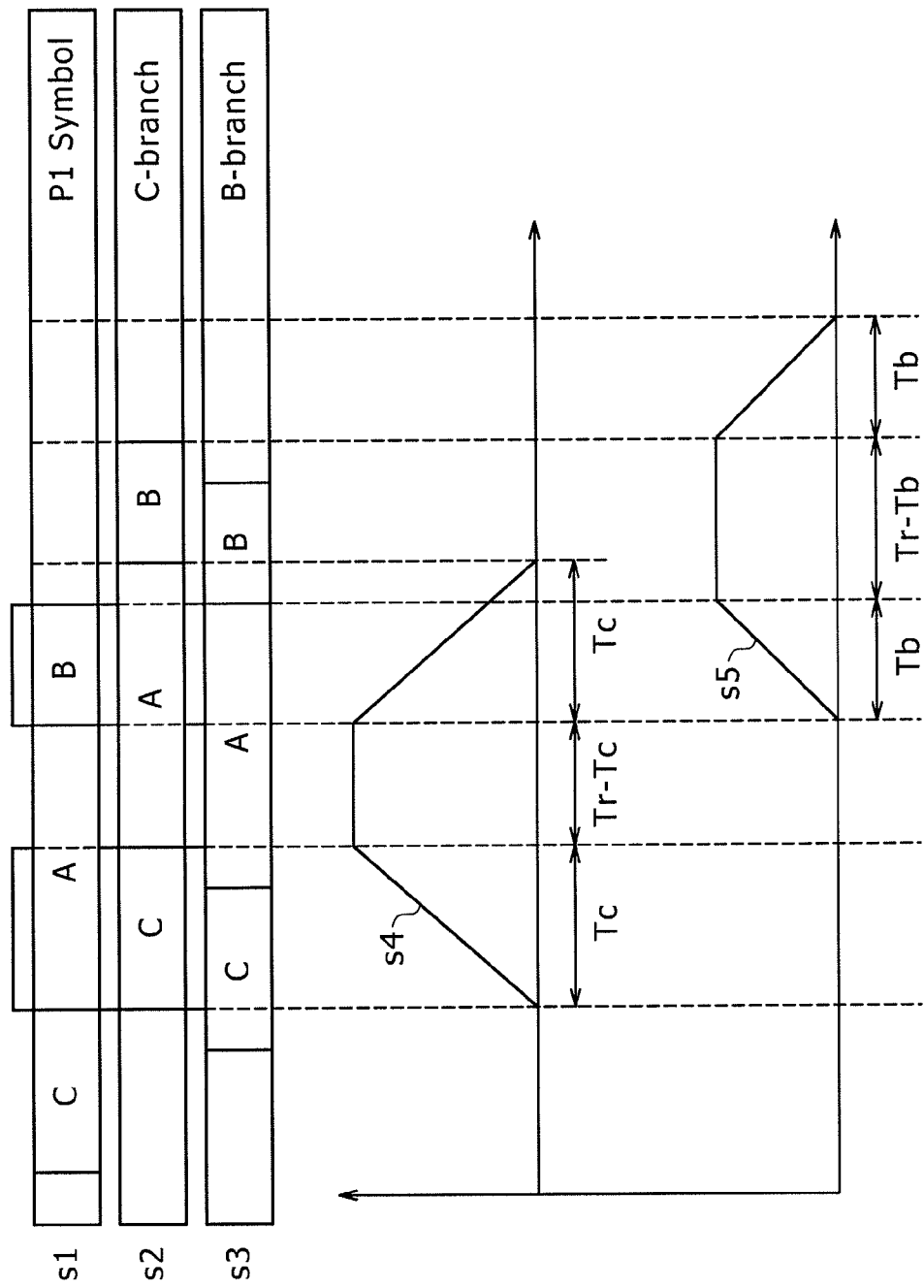
FIG. 9 is a diagram illustrating exemplary signals obtained in the blocks shown in FIG. 8.

Referring to FIG. 9, there is shown examples of signals that are obtained in the blocks shown in FIG. 8.

Signal s1 shown on top in the figure is a P1 symbol signal entered in the correlation value computation portion 11A shown in FIG. 8 as an input signal. If signal s1 with the start position of signal C being the beginning is input, signal s2 shown in the middle is outputted from the delay block 32. In addition, signal s3 shown in the bottom is outputted from the delay block 36. Signal s2 is a signal obtained by delayed signal s1 by period of time Tc and signal s3 is a signal obtained by delaying signal s1 by period of time Tb.

Signal s1 shown on top and signal s2 shown in the middle are multiplied by each other by the multiplication block 33 and a moving average value of a multiplication result is computed by the moving average computation block 34, thereby providing signal s4 that has a waveform as shown below signal s3.

As shown in FIG. 9, signal s4 has a waveform that rises in section Tc from the start position (the end position of signal C) of valid symbol A of the input signal, keeps constant in section Tr-Tc, and then falls in section Tc. Tr is indicative of the length of valid symbol A as shown on the right side shown in FIG. 10.

Also, signal s1 shown on top and signal s3 shown in the bottom are multiplied by each other by the multiplication block 37 and a moving average value of a multiplication result is computed by the moving average computation block 38, thereby providing signal s5 that has a waveform as shown below signal s4.

Signal s5 has a waveform that rises in section Tb from the end position (the start position of signal B) of valid symbol A of the input signal, keeps constant in section Tr-Tb, and then falls in section Tb.

Figure 10:
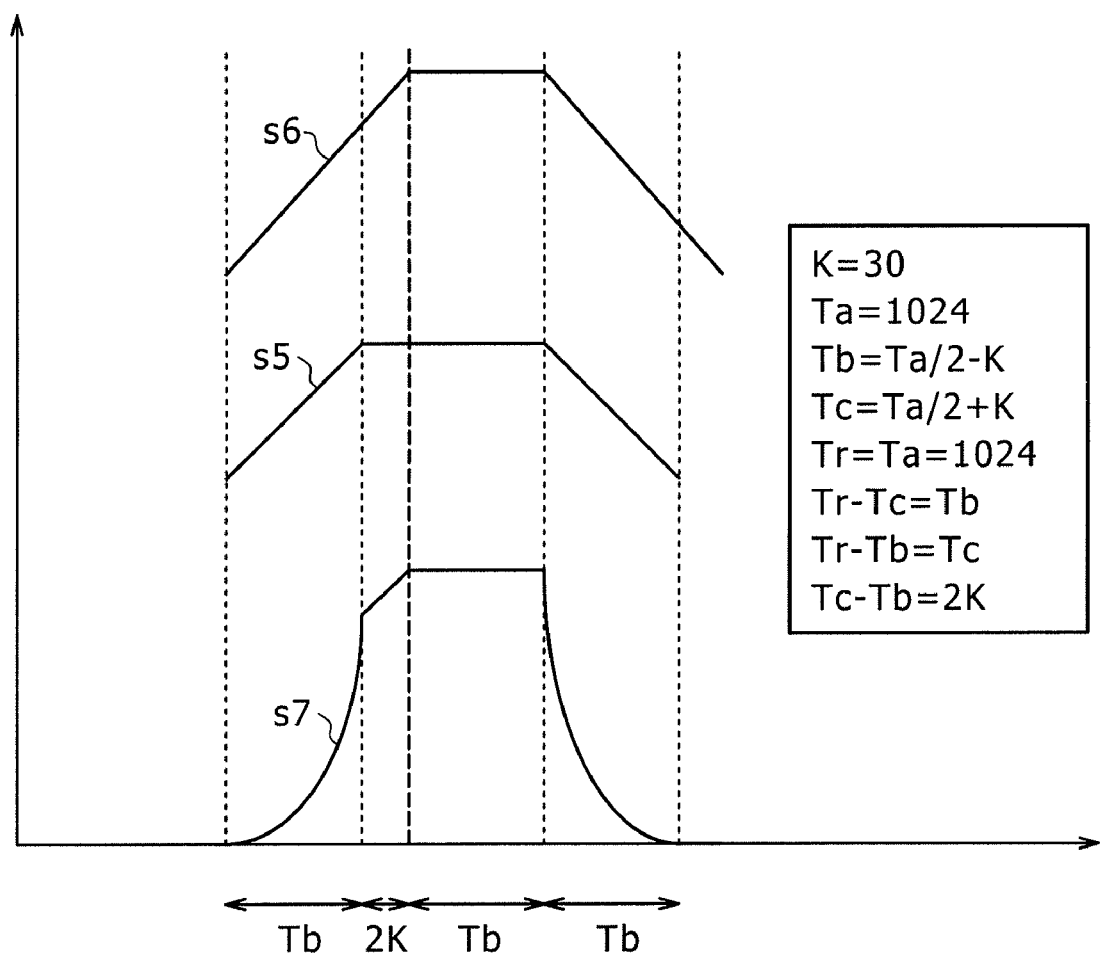
FIG. 10 is a diagram illustrating other examples of signals obtained in the blocks shown in FIG. 8.

FIG. 10 shows a waveform of a signal indicative of a correlation value between an input signal and an input signal delayed by Tc, a waveform of a signal indicative of a correlation value between an input signal and an input signal delayed by Tb, and a waveform of a signal indicative of a correlation value (a signal section correlation value) obtained by multiplying these two signals.

When signal s4 shown in FIG. 9 is delayed by Ta by the delay block 35, signal s6 having a waveform shown on top of FIG. 10 is obtained. When signal s6 is multiplied by signal s5 by the multiplication block 39, signal s7 shown in the bottom is obtained. It should be noted that, in FIG. 10, a difference between period of time Tc of signal C and period of time Tb of signal B is represented by 2K with a K value being 30 samples.

As described with reference to FIG. 7, on the basis of signal s7 shown in FIG. 10 obtained by the correlation value computation portion 11A, the P1 detection block 11 sets the position at which the signal section correlation peak value has been detected as the beginning of the T2 frame. In addition, the P1 detection block 11 outputs the information indicative of the FFT computation start position to the FFT computation block 14 and outputs a fine correction value to the frequency correction block 13.

The delay block 12 delays the input OFDM signal and output the delay signal to the frequency correction block 13.

On the basis of the fine correction value supplied from the P1 detection block 11 the frequency correction block 13 corrects the frequency offset of the OFDM signal supplied from the delay block 12 and outputs the corrected OFDM signal to the FFT computation block 14.

The FFT computation block 14 performs FFT computation on the OFDM signal supplied from the frequency correction block 13 and outputs the OFDM signal in the frequency domain to the CDS correlation computation block 15.

The CDS correlation computation block 15 computes a CDS correlation value that is a correlation value between a sequence of subcarriers having the power of the OFDM signal supplied from the FFT computation block 14 and a known sequence, thereby detecting a P1 symbol. In addition, the CDS correlation computation block 15 outputs a correlation peak value that is the peak value of the CDS correlation value to the T2 signal presence/absence determination block 17.

Referring to FIG. 11, there is shown a diagram illustrating powers of the OFDM signal of the P1 symbol.

The horizontal axis shown in FIG. 11 is representative of carrier index as frequency and the vertical axis is representative of powers of subcarriers. Of the upward arrows indicative of subcarriers, longer arrows are indicative of subcarriers (or active carriers) having power allocated with data and shorter arrows are indicative of subcarriers (or unused carriers) having no power allocated with no data.

As shown in FIG. 11, an OFDM signal of a P1 symbol has 853 subcarriers as valid subcarriers. With the DVB-T2 standard, data is allocated to 384 subcarriers among the 853 subcarriers.

The CDS correlation computation block 15 computes a CDS correlation value by use of such a known sequence, thereby detecting, as a section of the P1 symbol, a section of a sequence of subcarriers having power in which a correlation value with the known sequence is maximized. In addition, the CDS correlation computation block 15 outputs the CDS correlation peak value to the T2 signal presence/absence determination block 17 and outputs the FFT-computed OFDM signal and the coarse correction value to the coarse correction/descramble processing block 21.

On the basis of the coarse correction value supplied from the CDS correlation computation block 15, the coarse correction/descramble processing block 21 corrects the frequency offset of the OFDM signal and outputs the OFDM signal on which descrambling and other processing have been performed to the DBPSK demodulation block 22.

Of the sequences of signal points obtained by performing DBPSK demodulation on the OFDM signal supplied from the coarse correction/descramble processing block 21, the DBPSK demodulation block 22 outputs a sequence of an S1 part included in the P1 symbol to the S1 demodulation block 23 and a sequence of an S2 part to the S2 demodulation block 24. It should be noted that a bit train of 0 and 1 obtained by the hard decision of the result of DBPSK demodulation may be outputted from the DBPSK demodulation block 22 for use in the decoding of S1 and S2.

The S1 demodulation block 23 computes correlation values between the sequence of signal points supplied from the DBPSK demodulation block 22 and eight types of known sequences corresponding to the 3-bit S1.

The S2 demodulation block 24 computes correlation values between the sequence of signal points supplied from the DBPSK demodulation block 22 and 16 types of known sequences corresponding to the 4-bit S2.

Referring to FIG. 12, there is shown known sequences of S1 and S2 specified by the DVB-T2 standard.

As shown in FIG. 12, eight types of values 000, 001, 010, 011, 100, 101, 110, and 111 are specified as S1 values and 16 types of values 0000, 0001, 0010, 0011, 0100, 0101, 0110, 0111, 1000, 1001, 1010, 1011, 1100, 1101, 1110, and 1111 are specified as S2 values. Known sequences in hexadecimal notation are shown to the right side of each value.

The S1 demodulation block 23 computes such correlation values between a sequence of signal points supplied from the DBPSK demodulation block 22 and eight types of known sequences representative of S1 as correlation values between a supplied sequence of signal points and a known sequence corresponding to 000, correlation values between a supplied sequence of signal points and a known sequence corresponding to 001, and so on. Of the eight computed correlation values, the S1 demodulation block 23 selects, as S1, a 3-bit value corresponding to the known sequence of which maximum correlation value has been obtained among the computed eight correlation values and outputs the selected S1.

Further, the S1 demodulation block 23 outputs the maximum value among the computed eight correlation values to the T2 signal presence/absence determination block 17 as an S1 correlation maximum value.

The S2 demodulation block 24 computes such correlation values between a sequence of signal points supplied from the DBPSK demodulation block 22 and 16 types of known sequences representative of S2 as correlation values between a supplied sequence of signal points and a known sequence corresponding to 0000, correlation values between a supplied sequence of signal points and a known sequence corresponding to 001, and so on. Of the 16 computed correlation values, the S2 demodulation block 24 selects, as S2, a 4-bit value corresponding to the known sequence of which maximum correlation value has been obtained among the computed 16 correlation values and outputs the selected S2.

Further, the S2 demodulation block 24 outputs the maximum value among the computed 16 correlation values to the T2 signal presence/absence determination block 17 as an S2 correlation maximum value.

On the basis of the S1 correlation maximum value and the S2 correlation maximum value in addition to the signal section correlation peak value supplied from the correlation value computation portion 11A and the CDS correlation peak value supplied from the CDS correlation computation block 15, the T2 signal presence/absence determination block 17 determines whether or not a T2 signal is being transmitted on the channel being received.

To be more specific, even if both the signal section correlation peak value and the CDS correlation peak value are equal to or higher than the threshold values, the T2 signal presence/absence determination block 17 determines that no T2 signal is being transmitted on the channel being received as long as the S2 correlation maximum value is below the threshold value.

Moreover, even if the S1 correlation maximum value is equal to or higher than the threshold values, the T2 signal presence/absence determination block 17 determines that no T2 signal is being transmitted on the channel being received as long as the S2 correlation maximum value is below the threshold value.

Consequently, the probability that the absence of T2 signal can be correctly determined even if a correlation peak value above the threshold value is obtained in the correlation value computation portion 11A and the CDS correlation computation block 15 due to the influence or the like of an interference signal where there is actually no T2 signal.

Figure 5:
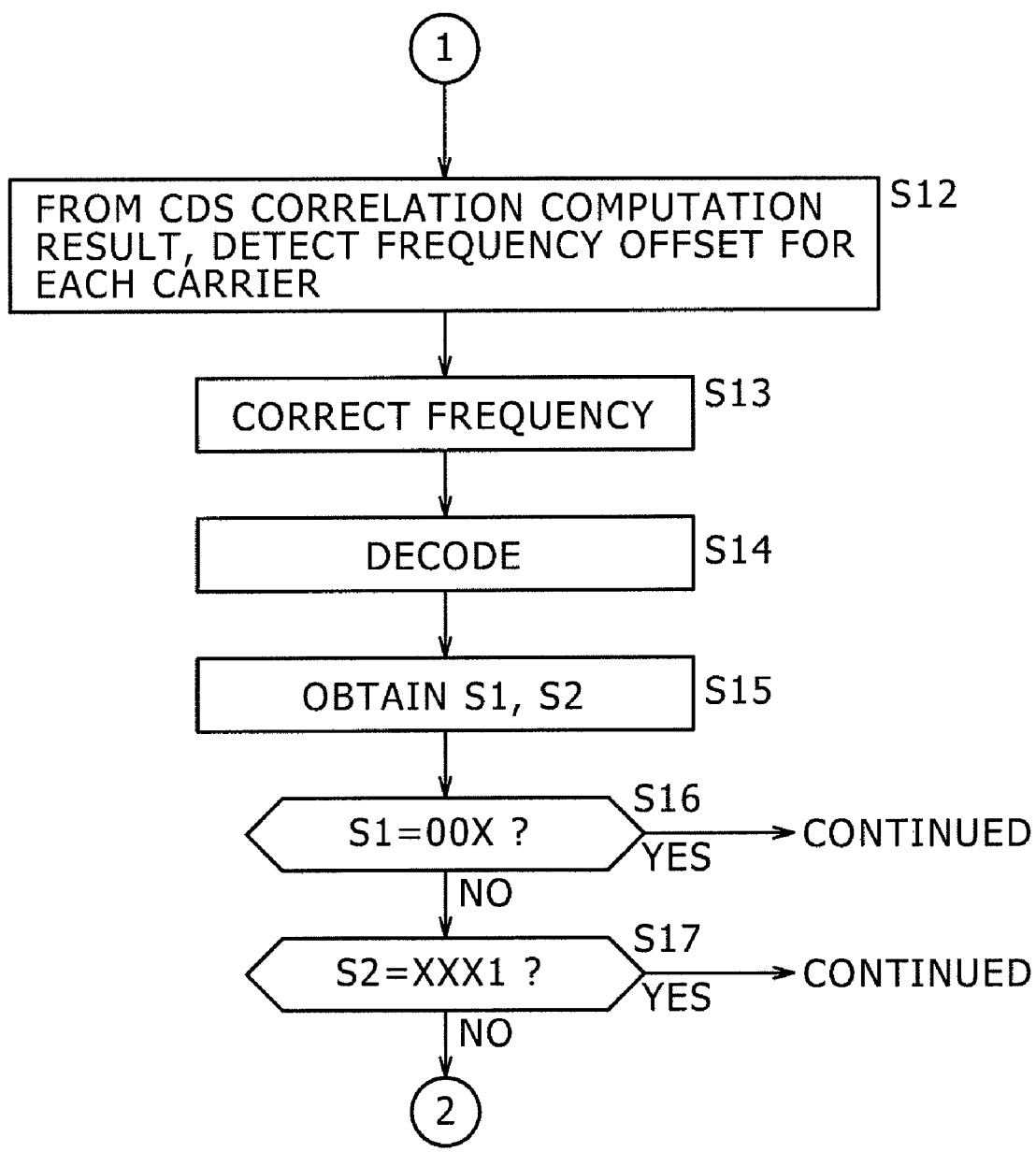
FIG. 5 is a flowchart continued from the flowchart shown in FIG. 4.

The correct determination of the absence of T2 signal can prevent the processing operations beginning with step S12 shown in FIG. 5 due to erroneous decision from being performed, thereby allowing the execution of a quick initial scan operation.

Operations to be Performed at the Time of Initial Scan

Figure 13:
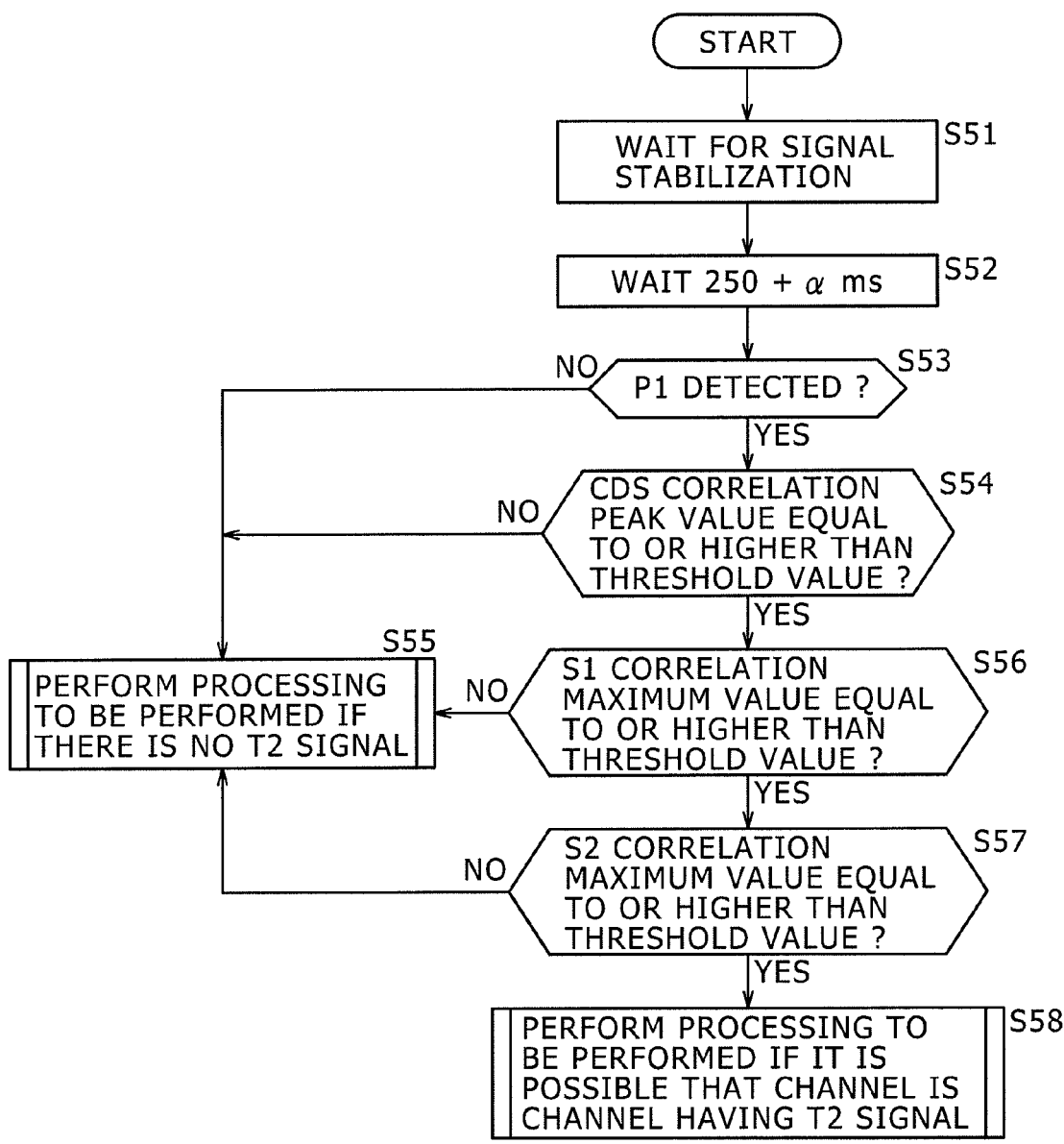
FIG. 13 is a flowchart indicative of processing to be performed at the time of initial scan.

The following describes the processing to be performed at the time of initial scan that is performed by the receiving apparatus 1 shown in FIG. 7 with reference to the flowchart shown in FIG. 13.

Figure 6:
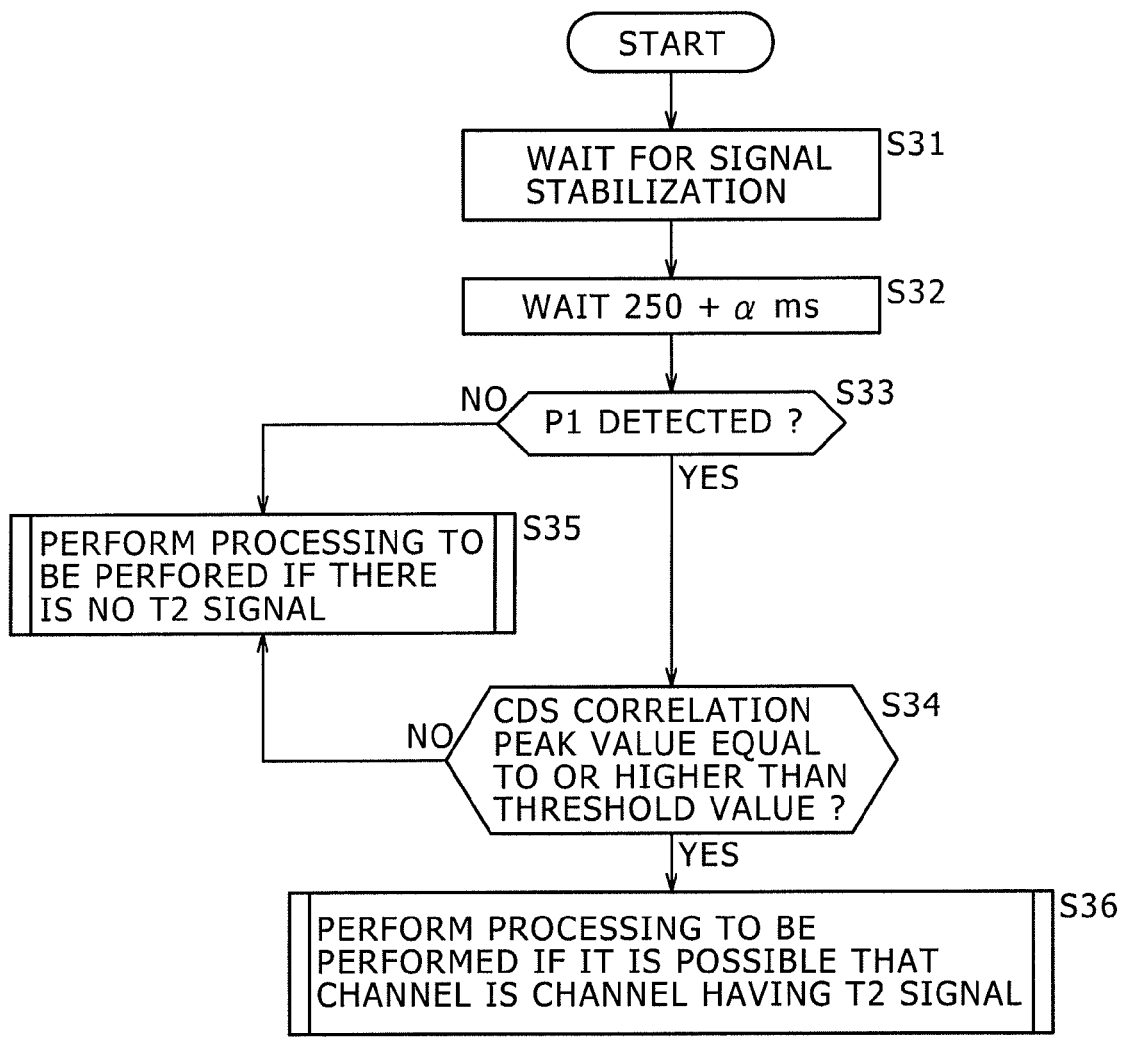
FIG. 6 is a flowchart indicative of processing of a T2 signal presence/absence determination block to be performed at the time of initial scan.

FIG. 13 shows the flowchart indicative of the processing to be performed at the time of initial scan described before with reference to FIG. 5 with attention mainly directed to the processing to be performed by the T2 signal presence/absence determination block 17. Basically, the processing shown in FIG. 13 is the same as the processing described before with reference to FIG. 6 except that determination processing using the S1 correlation maximum value and determination processing using the S2 correlation value maximum value are added.

In step S51, the T2 signal presence/absence determination block 17 waits until an input signal is stabilized.

If a signal stabilization flag is supplied, then the T2 signal presence/absence determination block 17 waits by 250+α ms in step S52.

Figure 4:
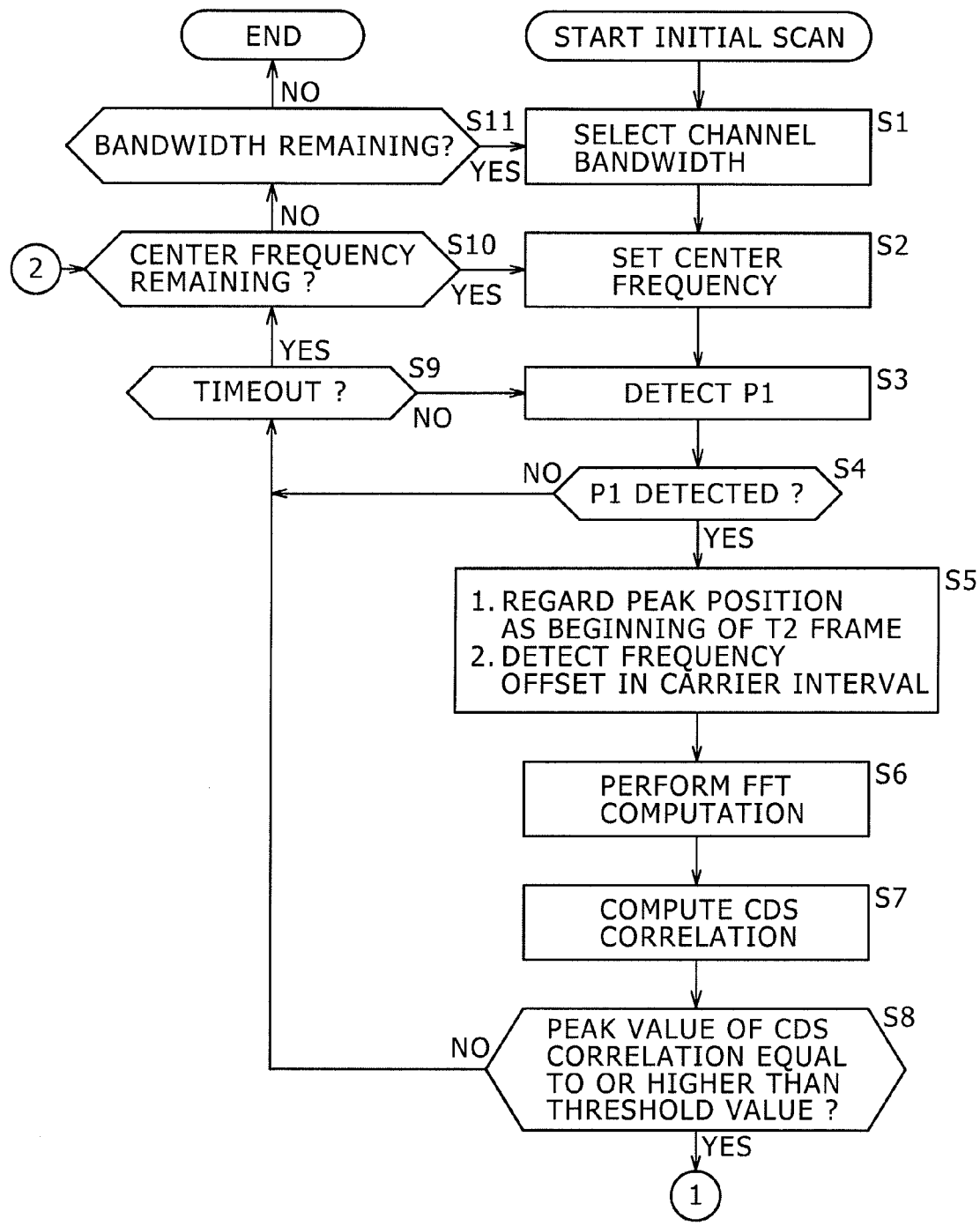
FIG. 4 is a flowchart indicative of processing to be executed at the time of initial scan.

In step S53, the T2 signal presence/absence determination block 17 compares the signal section correlation peak value with the threshold value as with the processing of step S4 shown in FIG. 4, thereby determining whether or not a P1 symbol has been detected.

If the signal section correlation peak value is found to be equal to or above the threshold value and therefore a P1 symbol is found detected in step S53, then the T2 signal presence/absence determination block 17 determines whether or not the CDS correlation peak value is above the threshold value in step S54 as with the processing of step S8 shown in FIG. 4.

If a P1 symbol is found not detected in step S53 or if the CDS correlation peak value is found to be less than the threshold value in step S54, then the processing to be performed if there is no T2 signal on the channel being receiving is performed in step S55. Namely, the processing that is performed when NO is determined in step S4 or step S8 shown in FIG. 4 is performed.

On the other hand, if the CDS correlation peak value is found to be above the threshold value in step S54, then the T2 signal presence/absence determination block 17 determines whether or not the S1 correlation maximum value is equal to or higher than a threshold value in step S56. It should be noted that, after the determination that the CDS correlation peak value is equal to or higher than a threshold value in step S54, the processing operations of step S12 through step S15 shown in FIG. 5 are performed. At that moment, the S1 correlation maximum value and the S2 correlation maximum value are respectively obtained at S1 and S2 decoding in step S14, and the S1 correlation maximum value is supplied from the S1 demodulation block 23 and the S2 correlation maximum value is supplied from the S2 demodulation block 24 to the T2 signal presence/absence determination block 17 for the comparison with the threshold value.

If the S1 correlation maximum value is found to be equal to or higher than the threshold value in step S56, then the T2 signal presence/absence determination block 17 determines whether or not the S2 correlation maximum value is equal to or higher than a threshold value in step S57.

If the S2 correlation maximum value is found to be equal to or higher than a threshold value in step S57, then the processing to be performed when it is possible for the channel to have a T2 signal is performed in step S58. Here, the processing operations beginning with step S16 shown in FIG. 5 are performed.

On the other hand, if the S1 correlation maximum value is found to be less than the threshold value in step S56 or the S2 correlation maximum value is found to be less than the threshold value in step S57, then the procedure goes to step S55 to perform the processing that is performed if there is no T2 signal. If there is no T2 signal on the channel being received, the T2 signal presence/absence determination block 17 outputs a T2 absence determination flag.

By use of the S1 and S2 correlation maximum values for determination of the presence or absence of a T2 signal, the probability of correctly determining that no T2 signal is given can be increased even if a correlation peak value equal to or higher than the threshold value has been obtained by the correlation value computation portion 11A and the CDS correlation computation block 15 although there is actually no T2 signal.

Especially, if the threshold value for use in the comparison with a signal section correlation peak value or a CDS correlation peak value is set relatively low in order to prevent the erroneous decision that there is no T2 signal while a T2 signal is actually present, the possibility of an erroneous decision that there is a T2 signal while there is actually no T2 signal is present. The above-mentioned configuration can prevent this problem from happening.

The ability which correctly determines that there is no T2 signal allows the initial scan processing to be performed quickly.

Figure 1:
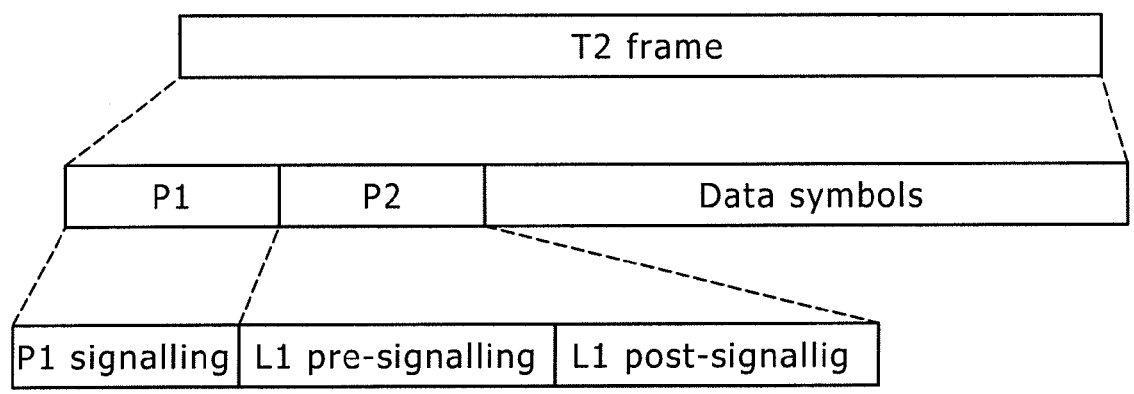
FIG. 1 is a diagram illustrating a format of a T2 frame.

If an erroneous decision is made that there is a T2 signal by the determination made by use of a signal section correlation peak value and a CDS correlation peak value, each subsequent determination is performed on the basis of incorrect S1 and S2. If S1 is determined to be "00X" or S2 is "XXX1" on the basis of incorrect S1 and S2 values (YES in step S16 or step S17 shown in FIG. 5), then a synchronism pull-in sequence is started in the following processing to get L1 pre-signalling (refer to FIG. 1) of P2 symbol. In this sequence, processing for waiting the detection of a next P1 symbol is performed, so that a wait of at least 250 ms must be given in terms of the standard.

By significantly reducing the probability of erroneously determining that a T2 signal is present while there is actually no T2 signal by use of S1 and S2 correlation maximum values as described above, the time required for performing the initial scan processing can be prevented from being getting longer. Because one session of the initial scan processing is performed on several tens of channels in a normal case, a large time saving effect can be achieved.

In the above-described case, of the determination processing based on an S1 correlation maximum value and the determination processing based on an S2 correlation maximum value, the determination processing based on an S1 correlation maximum value is performed first. It is also practicable to first perform the determination processing based on an S2 correlation maximum value.

Variations

Figure 14:
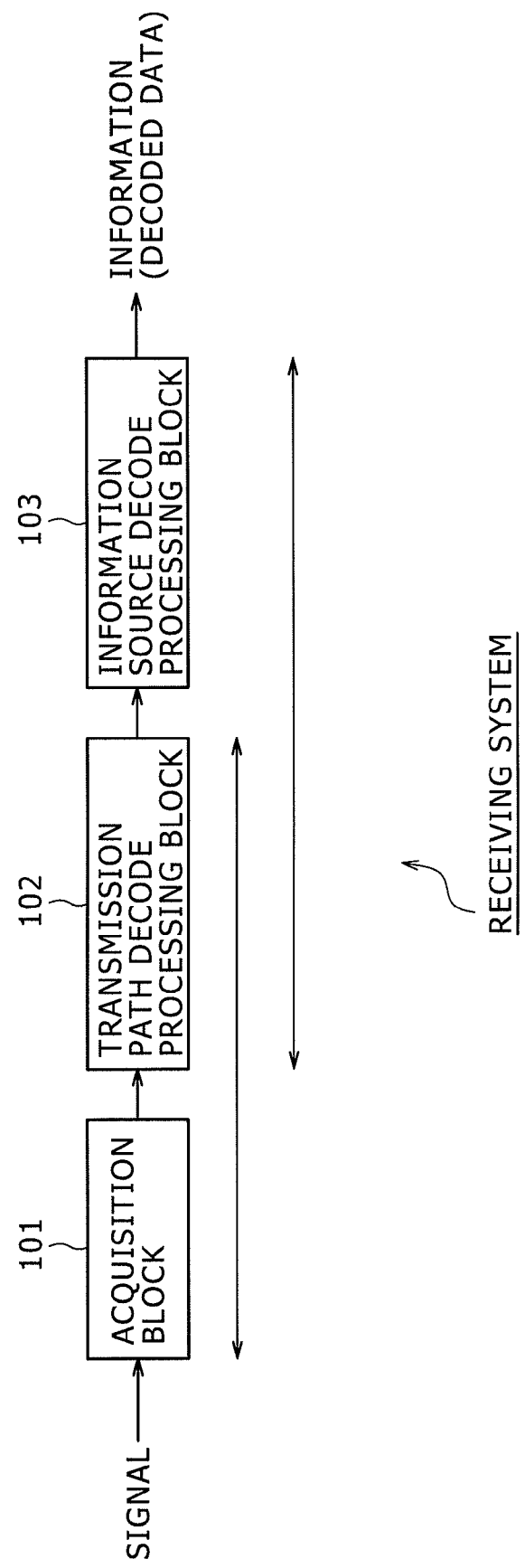
FIG. 14 is a block diagram illustrating an exemplary configuration of a first form of receiving system applied with the receiving apparatus of the present invention.

Now, referring to FIG. 14 there is shown a block diagram illustrating an exemplary configuration of a first form of receiving system applied with the receiving apparatus 1 of the present invention.

The receiving system shown in FIG. 14 is composed of an acquisition block 101, a transmission path decode processing block 102, and an information source decode processing block 102.

The acquisition block 101 obtains signals via transmission paths, such as terrestrial digital broadcasting, satellite digital broadcasting, CATV network, the Internet, and so on, and supplies the received signals to the transmission path decode processing block 102.

The transmission path decode processing block 102 performs transmission path decode processing including error correction on each signal obtained by the acquisition block 101 via a transmission path and supplies a resultant signal to the information source decode processing block 103. The receiving apparatus 1 shown in FIG. 7 is included in the transmission path decode processing block 102.

The information source decode processing block 103 decompresses the compressed signal on which transmission path decode processing has been performed and performs, on the decompressed signal, information source decode processing including the processing of acquiring data to be transmitted.

To be more specific, each signal obtained by the acquisition block 101 via a transmission path may have been compression coded for compressing information in order to reduce the data size of image or audio data. In this case, the information source decode processing block 103 performs, on the signal on which transmission path decode processing has been performed, the information source decode processing such as decompressing the compressed information to the original signal.

It should be noted that, if the signal obtained by the acquisition block 101 via a transmission path is not compression-coded, the information source decode processing block 103 does not decompress the information to the original information. The decompression processing includes moving picture experts group (MPEG) decoding, for example. The information source decode processing includes descrambling in addition to decompression processing.

The receiving system shown in FIG. 14 is applicable to television tuners for example that are configured to receive digital television broadcasting. It should be noted that the acquisition block 101, the transmission path decode processing block 102, and the information source decode processing block 103 may each be configured by a single independent unit (hardware (IC (Integrated Circuit) for example) or a software module.

In addition, the acquisition block 101, the transmission path decode processing block 102, and the information source decode processing block 103 may all be configured as one independent unit. It is also practicable to configure the acquisition block 101 and the transmission path decode processing block 102 as one independent unit, for example. Also, it is practicable to configure the transmission path decode processing block 102 and the information source decode processing block 103 as one independent unit, for example.

FIG. 15 is a block diagram illustrating an exemplary configuration of a second form of receiving system applied with the receiving apparatus 1 of the present invention.

With reference to FIG. 15, components previous described with reference to FIG. 14 are denoted by the same reference numerals and the description thereof is appropriately skipped.

The configuration of the receiving system shown in FIG. 15 is generally the same as the configuration shown in FIG. 14 in an acquisition block 101, a transmission path decode processing block 102, and an information source decode processing block 103 and different from the configuration shown in FIG. 14 in an output block 111.

The output block 111 is a display unit for displaying images or a loudspeaker for outputting sound, which outputs images and audio data that are signals outputted from the information source decode processing block 103. Namely, the output block 111 displays images and outputs sound.

The receiving system shown in FIG. 15 is applicable to radio receivers for example that are configured to receive television broadcasting as digital broadcasting and radio broadcasting.

It should be noted that, if the signal obtained by the acquisition block 101 is not compression-coded, the signal outputted from the transmission path decode processing block 102 is supplied directly to the output block 111.

FIG. 16 is a block diagram illustrating an exemplary configuration of a third form of receiving system applied with a frequency and phase synchronization circuit of the present invention.

With reference to FIG. 16, components previous described with reference to FIG. 14 are denoted by the same reference numerals and the description thereof is appropriately skipped.

The configuration of the receiving system shown in FIG. 16 is generally the same as the configuration shown in FIG. 14 in an acquisition block 101 and a transmission path decode processing block 102 and different from the configuration shown in FIG. 14 that the information source decode processing block 103 is not arranged and a recording block 121 is newly arranged.

The recording block 121 is configured to record (or store) a signal (MPEG TS packets for example) outputted from the transmission path decode processing block 102 to an optical disk, a hard disk (or a magnetic disk), a flash memory, and other recording (or storage) media.

The above-described receiving system shown in FIG. 16 is applicable to recorder devices for example configured to record television broadcasting.

It should be noted that an information source decode processing block 103 may be arranged as to record a signal on which information source decode processing has been performed by the information source decode processing block 103, namely the image and audio data obtained by decoding, to the recording block 121.

The above-mentioned sequence of processing operations may be performed by software as well as hardware. When the above-mentioned sequence of processing operations is performed by software, the programs constituting the software are installed in a computer which is built in dedicated hardware equipment or installed, from a network or recording media, into a general-purpose personal computer for example in which various programs may be installed for the execution of various functions.

FIG. 17 is a block diagram illustrating an exemplary hardware configuration of a computer that executes the above-mentioned sequence of processing operations by software programs.

A CPU (Central Processing Unit) 151, a ROM (Read Only Memory) 152, and a RAM (Random Access Memory) are interconnected by a bus 154.

The bus 154 is further connected with an input/output interface 155. The input/output interface 155 is connected with an input block 156 based on a keyboard and a mouse, for example, and an output block 157 based on a display monitor and a loudspeaker, for example. The input/output interface 155 is also connected with a storage block 158 based on a hard disk drive and a nonvolatile memory, for example, a communication block 159 based on a network interface for example, and a drive 160 configured to drive a removable media 161.

With the computer configured as described above, the CPU 151 loads programs from the storage block into the RAM 153 via the input/output interface 155 and the bus 154 for execution, thereby executing the sequence of processing operations described above.

Programs to be executed by the CPU 151 are provided as recorded to the removable media 161 for example or via wired or wireless transmission media such as a local area network, the Internet, or digital broadcasting, for example and are installed in the storage block 158.

It should be noted that the programs to be executed by the computer may be programs that are executed in a time-dependent manner along a sequence described herein or programs that are executed in parallel or on an on-demand basis.

It should be noted that the present invention is not limited only to the above-described embodiment but various changes can be made without departing from the gist of the present invention.

The present application contains subject matter related to that disclosed in Japanese Priority Patent Application JP 2009-187803 filed in the Japan Patent Office on Aug. 13, 2009, the entire content of which is hereby incorporated by reference.

What is claimed is:

1. A receiving apparatus comprising:
    first correlation value computation means for receiving an orthogonal frequency division multiplexing signal based on a predetermined standard for transmitting data in unit of a frame arranged, at a beginning of said frame, with a preamble signal having a correlation between a first section and a second section that are parts of an entire signal, thereby computing a first correlation value which is a correlation value of signals in two sections separated from each other by a time equal to a time interval between said first section and said second section;
    operation means for performing Fourier transform processing on said preamble signal including the signals of the two sections with said first correlation value equal to or higher than a threshold value obtained, thereby generating said orthogonal frequency division multiplexing signal of frequency domain;
    second correlation value computation means for computing a second correlation value which is a correlation value between a sequence of subcarriers for use in data transmission among subcarriers of said orthogonal frequency division multiplexing signal of frequency domain and a known sequence;
    decoding means for computing third correlation values, each of said third correlation values being a correlation value between data transmitted by subcarriers of a sequence with said second correlation value with said known sequence equal to or higher than a threshold value and a plurality of known items of data having a same number of bits as a bit train indicative of a transmission parameter for use in demodulation of a signal subsequent to said preamble signal, thereby decoding known data having a maximum value of said third correlation values as said transmission parameter; and
    determination means for determining whether said maximum value of said plurality of third correlation values computed by said decoding means is less than a predetermined threshold value and, if said maximum value is found to be less than said predetermined threshold value, outputting a signal indicative that said orthogonal frequency division multiplexing signal based on said predetermined standard is not being transmitted on a channel being received.

2. The receiving, apparatus according to claim 1, wherein, if a maximum value of said first correlation value is higher than a first threshold value and a value of said second correlation value is higher than a second threshold value, said determination means makes comparison between a maximum value of said plurality of third correlation values and said predetermined threshold value.

3. The receiving apparatus according to claim 1, wherein said predetermined standard is the digital video broadcasting—terrestrial 2 standard and said preamble signal is a P1 symbol.

4. The receiving apparatus according to claim 3, wherein said decoding means includes
   first decoding means for computing a correlation value between data transmitted by subcarriers of a sequence and said known sequence with said second correlation value equal to or higher than a threshold value and eight types of 3-bit data making up S1 in the digital video broadcasting—terrestrial 2 standard, thereby decoding the 3-bit data having a highest correlation value as S1; and
   second decoding means for computing a correlation value between data transmitted by subcarriers of a sequence and said known sequence with said second correlation nine with equal to or higher than a threshold value and sixteen types of 4-bit data making up S2 in the digital video broadcasting—terrestrial 2 standard, thereby decoding the 4-bit data having a highest correlation value as S2.

5. The receiving apparatus according to claim 4, wherein, if a maximum value in a plurality of correlation values computed by said first decoding means and a maximum value of a plurality of correlation values computed by said second decoding means are less than said predetermined threshold value, said determination means outputs a signal indicative that said orthogonal frequency division multiplexing signal of said predetermined standard is not being transmitted on a channel being received.

6. A receiving method comprising the steps of;
   receiving an orthogonal frequency division multiplexing signal based on a predetermined standard for transmitting data in unit of a frame arranged, at a beginning of said frame, with a preamble signal having a correlation between a first section and a second section that are parts of an entire signal, thereby computing a first correlation value, that is a correlation value of signals in two sections separated from each other by a time equal to a time interval between said first section and said second section;
   performing Fourier transform processing on said preamble signal including the signals of the two sections with said first correlation value equal to or higher than a threshold value obtained, thereby generating said orthogonal frequency division multiplexing signal of frequency
   computing a second correlation value which is a correlation value between a sequence of subcarriers for use in data transmission among subcarriers of said orthogonal frequency division multiplexing signal of frequency domain and a known sequence;
   computing third correlation values, each of said third correlation values being a correlation value between data transmitted by subcarriers of a sequence with said second correlation value with said known sequence equal to or higher than a threshold value and a plurality of known items of data having a same number of bits as a bit train indicative of a transmission parameter for use in a demodulation of a signal subsequent to said preamble signal, thereby decoding known data having a maximum value of said third correlation values as said transmission parameter; and
   determining whether said maximum value of said plurality of third correlation values computed in the decoding step is less than a predetermined threshold value and, if said maximum value is found to be less than said predetermined threshold value, outputting a signal indicative that said orthogonal frequency division multiplexing signal based on said predetermined standard is not being transmitted on a channel being received.

7. A receiving apparatus having processor programmed to include:
   a first correlation value computation section configured to receive an orthogonal frequency division multiplexing signal based on a predetermined standard for transmitting data in unit of a frame arranged, at a beginning of said frame, with a preamble signal having a correlation between a first section and a second section that are parts of an entire signal, thereby computing a first correlation value which is a correlation mine of signals in two sections separated from each other by a time equal to a time interval between said first section and said second section;
   an operation section configured to perform Fourier transform processing on said preamble signal including the signals of the two sections with said first correlation value equal to or higher than a threshold value obtained, thereby generating said orthogonal frequency division multiplexing signal of frequency domain;
   a second correlation value computation section configured to compute a second correlation value which is a correlation value between a sequence of subcarriers for use in data transmission among subcarriers of said orthogonal frequency division multiplexing signal of frequency domain and a known sequence;
   a decoding section configured to compute third correlation values, each of said third correlation values being a correlation value between data transmitted by subcarriers of a sequence with said second correlation value with said known sequence equal to or higher than a threshold value and a plurality of known items of data having a same number of bits as a bit train indicative of a transmission parameter for use in demodulation of a signal subsequent to said preamble signal, thereby decoding known data having a maximum value of said third correlation values as said transmission parameter; and
   a determination section configured to determine whether said maximum value of said plurality of third correlation values computed by said decoding section is less than predetermined threshold value and, if said maximum value is found to be less than said predetermined threshold value, output a signal indicative that said orthogonal frequency division multiplexing signal based on said predetermined standard is not being transmitted on a channel being received.

* * * * *